United States Patent
Champagne et al.

(10) Patent No.: US 9,850,418 B2
(45) Date of Patent: Dec. 26, 2017

(54) METHODS AND COMPOSITIONS FOR USE IN OIL AND/OR GAS WELLS

(71) Applicant: Flotek Chemistry, LLC, Marlow, OK (US)

(72) Inventors: Lakia M. Champagne, The Woodlands, TX (US); Angus Fursdon-Welsh, Magnolia, TX (US)

(73) Assignee: Flotek Chemistry, LLC, Marlow, OK (US)

( * ) Notice: Subject to any disclaimer, the term of this patent is extended or adjusted under 35 U.S.C. 154(b) by 0 days.

(21) Appl. No.: 15/288,066

(22) Filed: Oct. 7, 2016

(65) Prior Publication Data

US 2017/0096594 A1    Apr. 6, 2017

Related U.S. Application Data

(60) Division of application No. 14/212,650, filed on Mar. 14, 2014, now Pat. No. 9,464,223, which is a continuation-in-part of application No. 13/918,155, filed on Jun. 14, 2013, now Pat. No. 9,321,955, and a continuation-in-part of application No. 13/918,166, filed on Jun. 14, 2013, and a continuation-in-part of application No. 13/829,495, filed on Mar. 14, 2013, now Pat. No. 9,428,683, and a continuation-in-part of
(Continued)

(51) Int. Cl.
| | |
|---|---|
| *C09K 8/62* | (2006.01) |
| *C09K 8/36* | (2006.01) |
| *C09K 8/42* | (2006.01) |
| *C09K 8/60* | (2006.01) |
| *C09K 8/584* | (2006.01) |

(52) U.S. Cl.
CPC ............... *C09K 8/36* (2013.01); *C09K 8/42* (2013.01); *C09K 8/584* (2013.01); *C09K 8/602* (2013.01); *C09K 8/62* (2013.01)

(58) Field of Classification Search
None
See application file for complete search history.

(56) References Cited

U.S. PATENT DOCUMENTS

| | | | |
|---|---|---|---|
| 3,060,210 | A | 4/1961 | De Groote et al. |
| 3,047,062 | A | 7/1962 | Meadors |
| 3,347,789 | A | 10/1967 | Dickson et al. |

(Continued)

FOREIGN PATENT DOCUMENTS

| | | |
|---|---|---|
| CN | 102127414 | 7/2011 |
| CN | 102277143 | 12/2011 |

(Continued)

OTHER PUBLICATIONS

[No Author Listed], The HLB system: a time-saving guide to emulsifier selection. ICI Americas Inc. 1976. 22 pages.
(Continued)

*Primary Examiner* — Alicia Bland
(74) *Attorney, Agent, or Firm* — Wolf, Greenfield & Sacks, P.C.

(57) ABSTRACT

Methods and compositions comprising an emulsion or a microemulsion for use in various aspects of the life cycle of an oil and/or gas well are provided. In some embodiments, the emulsion or the microemulsion comprises water, a solvent, and a surfactant, and optionally, one or more additives.

27 Claims, 1 Drawing Sheet

Related U.S. Application Data application No. 13/829,434, filed on Mar. 14, 2013, now Pat. No. 9,068,108.

(60) Provisional application No. 61/946,176, filed on Feb. 28, 2014.

(56) References Cited

U.S. PATENT DOCUMENTS

| | | |
|---|---|---|
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,207,193 A | 6/1980 | Ford et al. |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,842,776 A | 6/1989 | Schmidt |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,154,754 A | 10/1992 | Damo et al. |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,741,502 A | 4/1998 | Roberts |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,858,928 A | 1/1999 | Aubert et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 * | 6/2008 | Pursley .......... C09K 8/035 166/305.1 |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |

(56) References Cited

U.S. PATENT DOCUMENTS

| | | |
|---|---|---|
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 9,464,223 B2 | 10/2016 | Champagne et al. |
| 2001/0007663 A1 | 7/2001 | Von Corswant |
| 2002/0125010 A1 | 9/2002 | Collins et al. |
| 2003/0022944 A1 | 1/2003 | Gumkowski et al. |
| 2003/0069143 A1 | 4/2003 | Collins |
| 2003/0166472 A1 | 9/2003 | Pursley et al. |
| 2003/0232095 A1 | 12/2003 | Garti et al. |
| 2005/0209107 A1 | 9/2005 | Pursley et al. |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1* | 8/2011 | Weerasooriya ........ C09K 8/584 507/254 |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0035085 A1 | 2/2012 | Parnell et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262261 A1 | 9/2014 | Hill et al. |
| 2014/0262274 A1 | 9/2014 | Dismuke et al. |
| 2014/0262288 A1 | 9/2014 | Penny et al. |
| 2014/0274817 A1 | 9/2014 | Hill et al. |
| 2014/0274822 A1 | 9/2014 | Dismuke et al. |
| 2014/0284053 A1 | 9/2014 | Germack et al. |
| 2014/0284057 A1 | 9/2014 | Champagne et al. |
| 2014/0299325 A1 | 10/2014 | Zelenev et al. |
| 2014/0332212 A1 | 11/2014 | Ayers et al. |
| 2014/0338911 A1 | 11/2014 | Dismuke et al. |
| 2014/0367107 A1 | 12/2014 | Hill et al. |
| 2014/0371115 A1 | 12/2014 | Hill et al. |
| 2015/0053404 A1 | 2/2015 | Penny et al. |
| 2015/0068755 A1 | 3/2015 | Hill et al. |
| 2015/0184061 A1 | 7/2015 | Saboowala et al. |

FOREIGN PATENT DOCUMENTS

| | | |
|---|---|---|
| CN | 103614128 | 3/2014 |
| CN | 103642477 | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 99/49182 | 9/1999 |
| WO | WO 03/74833 A2 | 9/2003 |
| WO | WO 2005/048706 | 6/2005 |
| WO | WO 2007/011475 | 1/2007 |
| WO | WO 2009/087199 | 7/2009 |
| WO | WO 2012/158645 | 11/2012 |

OTHER PUBLICATIONS

ADM, Evolution Chemicals E5789-117 Description. Jun. 2014.
Brost et al., Surfactants assist water-in-oil monitoring by fluroescence. World Oil. Oct. 2008;229(10).
Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.
Crafton et al., Micro-emulsion effectiveness for twenty four wells, eastern green river, Wyoming. 2009 SPE Rocky Mountain Petroleum Technology Conference. Denver, Colorado, USA, Apr. 14-16, 2009. SPE-123280. 13 pages.
Haw, The HLB system: a time saving guide to surfactant selection. Presentation to the Midwest chapter of the society of cosmetic chemists. Uniqema. Mar. 9, 2004. 39 slides.
Howard et al., Comparison of flowback aids: understanding their capillary pressure and wetting properties. SPE Production & Operations. Aug. 2010;:376-87.

(56) References Cited

OTHER PUBLICATIONS

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

U.S. Appl. No. 14/212,731, filed Mar. 14, 2014, Dismuke et al.
U.S. Appl. No. 14/212,763, filed Mar. 14, 2014, Dismuke et al.
U.S. Appl. No. 14/489,437, filed Sep. 17, 2014, Hill et al.
U.S. Appl. No. 14/644,351, filed Mar. 11, 2015, Saboowala et al.
U.S. Appl. No. 15/457,792, filed Mar. 13, 2017, Trabelsi et al.

\* cited by examiner

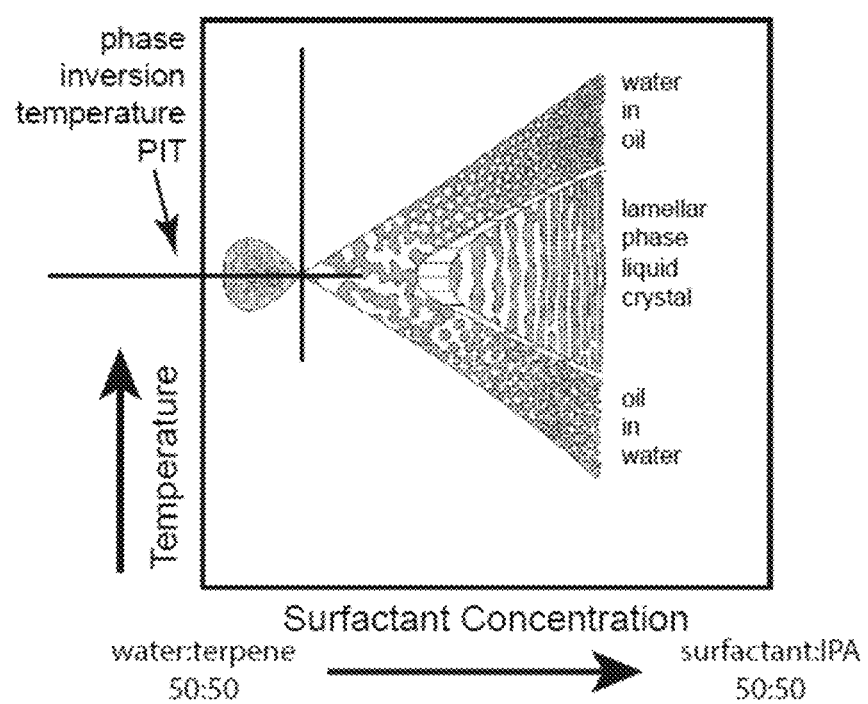

METHODS AND COMPOSITIONS FOR USE IN OIL AND/OR GAS WELLS

RELATED APPLICATIONS

This application is a divisional of U.S. application Ser. No. 14/212,650, filed Mar. 14, 2014, which claims priority under 35 U.S.C. §119(e) to U.S. Provisional Application No. 61/946,176 filed Feb. 28, 2014. U.S. application Ser. No. 14/212,650 is also a continuation-in-part of U.S. patent application Ser. No. 13/829,495 (now U.S. Pat. No. 9,428,683), filed Mar. 14, 2013; a continuation-in-part of U.S. patent application Ser. No. 13/829,434 (now U.S. Pat. No. 9,068,108), filed Mar. 14, 2013; a continuation-in-part of U.S. patent application Ser. No. 13/918,155 (now U.S. Pat. No. 9,321,955), filed Jun. 14, 2013; and a continuation-in-part of U.S. patent application Ser. No. 13/918,166, filed Jun. 14, 2013. All of the above-noted applications are incorporated herein by reference in their entirety for all purposes.

FIELD OF INVENTION

Methods and compositions comprising an emulsion or a microemulsion for use in various aspects of a life cycle of an oil and/or gas well are provided.

BACKGROUND OF INVENTION

For many years, petroleum has been recovered from subterranean reservoirs through the use of drilled wells and production equipment. Oil and natural gas are found in, and produced from, porous and permeable subterranean formations, or reservoirs. The porosity and permeability of the formation determine its ability to store hydrocarbons, and the facility with which the hydrocarbons can be extracted from the formation. Generally, the life cycle of an oil and/or gas well includes drilling to form a wellbore, casing, cementing, stimulation, and enhanced or improved oil recovery.

Various aspects of the life cycle of an oil and/or gas well are designed to facilitate the extraction of oil and/or gas from the reservoir via the wellbore. A wide variety of fluids is utilized during the life cycle of an oil and/or gas well and are well known. In order to improve extraction of oil and/or gas, additives have been incorporated into various fluids utilized during the life cycle of an oil and/or gas well. The incorporation of additives into fluids utilized during the life cycle of an oil and/or gas well can increase crude oil or formation gas, for example, by reducing capillary pressure and/or minimizing capillary end effects. For example, drilling fluids are utilized to carry cuttings and other particulates from beneath the drill bit to the surface and can function to reduce friction between the drill bit and the sides of the wellbore while maintaining the stability of uncased sections of the borehole. In addition, the drilling fluid and the subsequent cementing and perforating fluids can be formulated to prevent imbibition and/or unwanted influxes of some formation fluids. As another example, fracturing and acidizing are a commonly used techniques to stimulate the production of oil and/or gas from reservoirs, wherein a stimulation fluid is injected into the wellbore and the formation (reservoir). In a typical matrix acidizing or fracturing treatment, from 1 barrel per foot to several million gallons of stimulation fluid are pumped into a reservoir (e.g., via the wellbore). The stimulation fluid can comprise additives to aid in the stimulation process, for example, proppants, scale inhibitors, friction reducers, biocides, gases such as carbon dioxide and nitrogen, acids, slow release acids, corrosion inhibitors, buffers, viscosifiers, clay swelling inhibitors, oxygen scavengers, and surfactants. Later in the life of the well additional fluids and gases may be injected into the well to remediate damage, maintain pressure or contact and recover further oil.

When selecting or using a fluid to be utilized during the life cycle of an oil and/or gas well, it is important for the fluid to comprise the right combination of additives and components to achieve the necessary characteristics of the specific end-use application. A primary goal amongst all aspects of the life cycle of a well is to optimize recovery of oil and/or gas from the reservoir. However, in part because the fluids utilized during the life cycle of an oil and/or gas well are often utilized to perform a number of tasks simultaneously, achieving necessary to optimal characteristics is not always easy.

Accordingly, it would be desirable if a wide variety of additives were available which could be selected to achieve the necessary characteristics and/or could be easily adapted. Furthermore, it is desirable that the additives provide multiple benefits and are useful across multiple portions of the life cycle of the well. For example, a challenge often encountered is fluid recovery following injection of fracturing fluids or other fluids into the wellbore. Often, large quantities of injected fluids are trapped in the formation, for example, in the area surrounding the fracture and within the fracture itself. It is theorized that the trapping of the fluid is due to interfacial tension between water and reservoir rock and/or capillary end effects in and around the vicinity of the face of the fractured rock. The presence of trapped fluids generally has a negative effect on the productivity of the well. While several approaches have been used to overcome this problem, for example, incorporation of co-solvents and/or surfactants (i.e., low surface tension fluids), there is still the need for improved additives, as well as a greater understanding as to how to select the additives to maximize the productivity of the well. The use of microemulsions has also been employed, however, selection of an appropriate microemulsion for a particular application remains challenging, as well as there is a continued need for emulsions with enhanced abilities.

Accordingly, although a number of additives are known in the art, there is a continued need for more effective additives for increasing production of oil and/or gas.

SUMMARY OF INVENTION

Methods and compositions comprising an emulsion or a microemulsion for use in various aspects of the life-cycle of an oil and/or gas well are provided.

In some embodiments, a method of treating an oil and/or gas well having a wellbore is provided comprising injecting a fluid comprising an emulsion or microemulsion into the wellbore, wherein the emulsion or microemulsion comprises an aqueous phase; a surfactant; and a solvent, wherein the solvent comprises an amine of the formula $NR^1R^2R^3$, wherein each of $R^1$, $R^2$, and $R^3$ are the same or different and are alkyl, provide at least one of $R^1$, $R^2$, and $R^3$ is methyl or ethyl, or optionally, wherein any two of $R^1$, $R^2$, and $R^3$ are joined together to form a ring; and wherein the pH of the fluid is about neutral or greater.

In some embodiments, a method of treating an oil and/or gas well having a wellbore is provided comprising injecting a fluid comprising an emulsion or microemulsion into the wellbore, wherein the emulsion or microemulsion comprises an aqueous phase; a surfactant; and a solvent, wherein the solvent comprises an amide of the formula $(C=OR^4)R^5R^6$, wherein each of $R^4$, $R^5$, and $R^6$ are the same or different and are hydrogen or alkyl, or optionally, $R^5$ and $R^6$ are joined together to form a ring.

In some embodiments, a method of treating an oil and/or gas well having a wellbore is provided comprising injecting a fluid comprising an emulsion or microemulsion into the wellbore, wherein the emulsion or microemulsion comprises water; an alcohol; a solvent comprising a terpene; and a surfactant, wherein the surfactant has a structure as in Formula I:

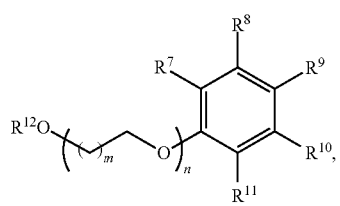

(I)

wherein each of $R^7$, $R^8$, $R^9$, $R^{10}$, and $R^{11}$ are the same or different and are selected from the group consisting of hydrogen, optionally substituted alkyl, and —CH=CHAr, provided at least one of $R^7$, $R^8$, $R^9$, $R^{10}$, and $R^{11}$ is —CH=CHAr; Ar is an aryl group; $R^{12}$ is hydrogen or alkyl; n is 1-100; and each m is independently 1 or 2.

In some embodiments, a method of treating an oil and/or gas well having a wellbore is provided comprising injecting a fluid comprising an emulsion or microemulsion into the wellbore, wherein the emulsion or microemulsion comprise water; an alcohol; a solvent comprising a terpene; and a surfactant, wherein the surfactant has a structure as in Formula II:

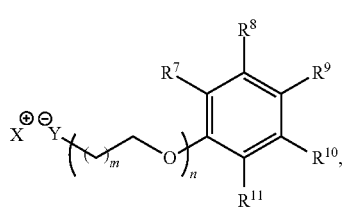

(II)

wherein each of $R^7$, $R^8$, $R^9$, $R^{10}$, and $R^{11}$ are the same or different and are selected from the group consisting of hydrogen, optionally substituted alkyl, and —CH=CHAr, provided at least one of $R^7$, $R^8$, $R^9$, $R^{10}$, and $R^{11}$ is —CH=CHAr; Ar is an aryl group; $Y^-$ is an anionic group; $X^+$ is a cationic group; n is 1-100; and each m is independently 1 or 2.

In some embodiments, a method of treating an oil and/or gas well having a wellbore is provided comprising injecting a fluid comprising an emulsion or microemulsion into the wellbore, wherein the emulsion or microemulsion comprises water; an alcohol; a solvent comprising a terpene; and a surfactant, wherein the surfactant has a structure as in Formula III:

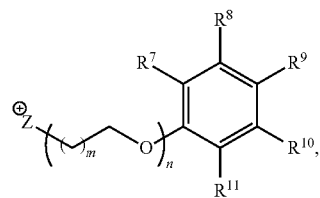

(III)

wherein each of $R^7$, $R^8$, $R^9$, $R^{10}$, and $R^{11}$ are the same or different and are selected from the group consisting of hydrogen, optionally substituted alkyl, and —CH=CHAr, provided at least one of $R^7$, $R^8$, $R^9$, $R^{10}$, and $R^{11}$ is —CH=CHAr; Ar is an aryl group; $Z^+$ is a cationic group; n is 1-100; and each m is independently 1 or 2.

In some embodiments, a method of treating an oil and/or gas well having a wellbore is provided comprising injecting a solution into the wellbore, wherein the solution comprising a fluid selected from the group consisting of a mud displacement fluid, a cementing fluid, a perforating fluid, a kill fluid, and EOR/IOR fluid, a stored fluid, or a stimulation fluid utilized in offshore wells or during fracture packing, and an emulsion or microemulsion, wherein the emulsion or the microemulsion comprises between about 1 wt % and 95 wt % water; between about 1 wt % and 99 wt % solvent; between about 0 wt % and about 50 wt % alcohol; between about 1 wt % and 90 wt % surfactant; between about 0 wt % and about 70 wt % freezing point depression agent; and between about 0 wt % and about 70 wt % other additives.

In some embodiments, a composition for use in an oil and/or gas well having a wellbore is provided comprising a fluid and an emulsion or microemulsion, wherein the emulsion or the microemulsion comprises water; an alcohol; a solvent comprising a terpene; and a surfactant in an amount between about 9 wt % and about 11 wt % versus the total emulsion, wherein the surfactant has a structure as in Formula I:

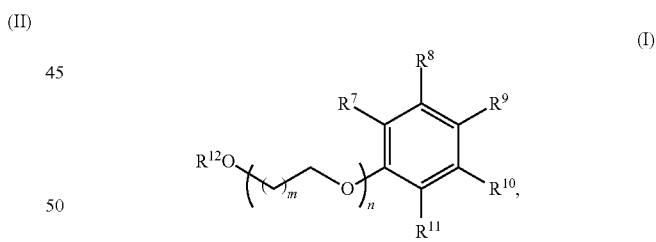

(I)

wherein each of $R^7$, $R^8$, $R^9$, $R^{10}$, and $R^{11}$ are the same or different and are selected from the group consisting of hydrogen, optionally substituted alkyl, and —CH=CHAr, provided at least one of $R^7$, $R^8$, $R^9$, $R^{10}$, and $R^{11}$ is —CH=CHAr; Ar is an aryl group; $R^{12}$ is hydrogen or alkyl; n is 1-100; and each m is independently 1 or 2.

In some embodiments, a composition for use in an oil and/or gas well having a wellbore is provided comprising a fluid and an emulsion or microemulsion, wherein the emulsion or the microemulsion comprises water; an alcohol; a solvent comprising a terpene; and a surfactant in an amount between about 9 wt % and about 11 wt % versus the total emulsion, wherein the surfactant has a structure as in Formula II:

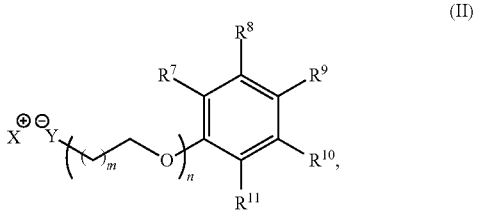

(II)

wherein each of $R^7$, $R^8$, $R^9$, $R^{10}$, and $R^{11}$ are the same or different and are selected from the group consisting of hydrogen, optionally substituted alkyl, and —CH=CHAr, provided at least one of $R^7$, $R^8$, $R^9$, $R^{10}$, and $R^{11}$ is —CH=CHAr; Ar is an aryl group; $Y^-$ is an anionic group; $X^+$ is a cationic group; n is 1-100; and each m is independently 1 or 2.

In some embodiments, a composition for use in an oil and/or gas well having a wellbore is provided comprising a fluid and an emulsion or microemulsion, wherein the emulsion or the microemulsion comprises water; an alcohol; a solvent comprising a terpene; and a surfactant in an amount between about 9 wt % and about 11 wt % versus the total emulsion, wherein the surfactant has a structure as in Formula III:

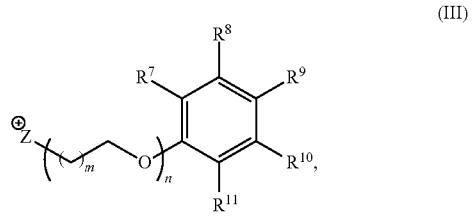

(III)

wherein each of $R^7$, $R^8$, $R^9$, $R^{10}$, and $R^{11}$ are the same or different and are selected from the group consisting of hydrogen, optionally substituted alkyl, and —CH=CHAr, provided at least one of $R^7$, $R^8$, $R^9$, $R^{10}$, and $R^{11}$ is —CH=CHAr; Ar is an aryl group; $Z^+$ is a cationic group; n is 1-100; and each m is independently 1 or 2.

Other aspects, embodiments, and features of the methods and compositions will become apparent from the following detailed description when considered in conjunction with the accompanying drawings. All patent applications and patents incorporated herein by reference are incorporated by reference in their entirety. In case of conflict, the present specification, including definitions, will control.

BRIEF DESCRIPTION OF THE DRAWINGS

The accompanying drawings are not intended to be drawn to scale. For purposes of clarity, not every component may be labeled in every drawing. In the drawings:

FIG. 1 shows an exemplary plot for determining the phase inversion temperature of a microemulsion, according to some embodiments.

DETAILED DESCRIPTION

Methods and compositions comprising an emulsion or a microemulsion for use in various aspects of the life cycle of an oil and/or gas well are provided. An emulsion or a microemulsion may comprise water, a solvent, a surfactant, a co-surfactant (e.g., an alcohol), and optionally other components (e.g., a clay stabilizer, a freezing point depression agent, an acid, a salt, etc.). In some embodiments, the solvent comprises more than one type of solvent (e.g., a first type of solvent and a second type of solvent). In some embodiments, the methods and compositions relate to various aspects of the life cycle of an oil and/or gas well (e.g., drilling, mud displacement, casing, cementing, perforating, stimulation, kill fluids, enhanced oil recovery/improved oil recovery, etc.). In some embodiments, an emulsion or a microemulsion is added to a fluid utilized in the life cycle of well thereby increasing hydrocarbon (e.g., liquid or gaseous) production of the well, improving recovery of the fluid and/or other fluids, and/or preventing or minimizing damage to the well caused by exposure to the fluid (e.g., from imbibition).

Additional details regarding the emulsion or microemulsions, as well as the applications of the emulsions or microemulsions, are described herein. For example, the emulsions and microemulsions described in the Section A may be utilized in any a wide variety of application in the life cycle of the well, as described in Section B.

I. Emulsions and Microemulsions

In some embodiments, emulsions or microemulsion are provided. The terms should be understood to include emulsions or microemulsions that have a water continuous phase, or that have an oil continuous phase, or microemulsions that are bicontinuous or multiple continuous phases of water and oil.

As used herein, the term emulsion is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term microemulsion is given its ordinary meaning in the art and refers to dispersions of one immiscible liquid in another, in the form of droplets, with diameters approximately in the range of about between about 1 and about 1000 nm, or between 10 and about 1000 nanometers, or between about 10 and about 500 nm, or between about 10 and about 300 nm, or between about 10 and about 100 nm. Microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, and (vi) ease of preparation.

In some embodiments, the microemulsions described herein are stabilized microemulsions that are formed by the combination of a solvent-surfactant blend with an appropriate oil-based or water-based carrier fluid. Generally, the microemulsion forms upon simple mixing of the components without the need for high shearing generally required in the formation of ordinary emulsions. In some embodiments, the microemulsion is a thermodynamically stable system, and the droplets remain finely dispersed over time. In some cases, the average droplet size ranges from about 10 nm to about 300 nm.

It should be understood, that while much of the description herein focuses on microemulsions, this is by no means limiting, and emulsions may be employed where appropriate.

In some embodiments, the emulsion or microemulsion is a single emulsion or microemulsion. For example, the emulsion or microemulsion comprises a single layer of a surfactant. In other embodiments, the emulsion or microemulsion may be a double or multilamellar emulsion or microemulsion. For example, the emulsion or microemulsion comprises two or more layers of a surfactant. In some embodiments, the emulsion or microemulsion comprises a single layer of surfactant surrounding a core (e.g., one or more of water, oil, solvent, and/or other additives) or a multiple layers of surfactant (e.g., two or more concentric layers surrounding the core). In certain embodiments, the emulsion or microemulsion comprises two or more immiscible cores (e.g., one or more of water, oil, solvent, and/or other additives which have equal or about equal affinities for the surfactant).

In some embodiments, a microemulsion comprises water, a solvent, and a surfactant. In some embodiments, the microemulsion further comprises additional components, for example, a freezing point depression agent. Details of each of the components of the microemulsions are described in detail herein. In some embodiments, the components of the microemulsions are selected so as to reduce or eliminate the hazards of the microemulsion to the environment and/or the subterranean reservoirs.

In some embodiments, the emulsion or microemulsion comprise between about 1 wt % and 95 wt % water, between about 1 wt % and 99 wt % solvent, between about 0 wt % and about 50 wt % alcohol, between about 1 wt % and 90 wt % surfactant, and between about 0 wt % and about 70 wt % freezing point depression agent, and between about 0 wt % and about 70 wt % other additives, versus the total microemulsion composition. In some embodiments, the emulsion or microemulsion comprise between about 1 wt % and 60 wt % water, between about 1 wt % and 30 wt % solvent, between about 1 wt % and about 50 wt % alcohol, between about 5 wt % and 65 wt % surfactant, and between about 0 wt % and about 25 wt % freezing point depression agent, and between about 0 wt % and about 30 wt % other additives, versus the total microemulsion composition. In some embodiments, for the formulation above, the water is present in an amount between about 10 wt % and about 55 wt %, or between about 15 wt % and about 45 wt %. In some embodiments, for the formulation above the solvent is present in an amount between about 2 wt % and about 25 wt %, or between about 5 wt % and about 25 wt %. In some embodiments, the solvent comprises a terpene. In some embodiments, for the formulations above, the alcohol is present in an amount between about 5 wt % and about 40 wt %, or between about 5 wt % and 35 wt %. In some embodiments, the alcohol comprises isopropanol. In some embodiments, for the formulations above, the surfactant is present in an amount between about 5 wt % and 60 wt %, or between about 10 wt % and 55 wt %. In some embodiments, for the formulations above, the freezing point depression agent is present in an amount between about 1 wt % and about 25 wt %, or between about 1 wt % and about 20 wt %, or between about 3 wt % and about 20 wt %. In some embodiments, for the formulations above, the other additives are present in an amount between about 1 wt % and about 30 wt %, or between about 1 wt % and about 25 wt %, or between about 1 wt % and about 20 wt %. In some embodiments, the other additives comprise one or more salts and/or one or more acids.

In some embodiments, a microemulsion composition comprises between about 5 wt % to about 60 wt % water, from about 2 wt % to about 50 wt % solvent, from about 5 wt % to about 60 wt % of a first type of a solubilizing surfactant, from about 2 wt % to about 50 wt % of alcohol, from about 0.5 to 30 wt % of a freezing point depression agent, from about 0.5 wt % to about 30 wt % of a second type of surfactant, from about 0 wt % to about 70 wt % of other additives (e.g., acid), and from about 0.5 wt % to about 30% of mutual solvent, which is miscible together with the water and the solvent. In some embodiments, the solvent is a substance with a significant hydrophobic character with linear, branched, cyclic, bicyclic, saturated or unsaturated structure, including but not limited to terpenes, terpineols, terpene alcohols, aldehydes, ketones, esters, amines, and amides. Non-limiting examples of suitable mutual solvents include ethyleneglycolmonobutyl ether (EGMBE), dipropylene glycol monomethyl ether, short chain alcohols (e.g., isopropanol), tetrahydrofuran, dioxane, dimethylformamide, and dimethylsulfoxide. Freezing point depressions agents are described in more detail herein, and include, but are not limited to, alkali metal or earth alkali metal salts, preferably chlorides, urea, alcohols (e.g., glycols such as propylene glycol and triethylene glycol). In some embodiments, the solubilizing surfactant is a molecule capable of forming a colloidal solution of the said solvent in predominantly aqueous media. Generally, surfactants are amphiphilic molecules that adsorb at interfaces to lower surface energy and can be used to form microemulsions in which they stabilize a mixture of polar and non-polar solvent. Non-limiting examples of suitable surfactants include nonionic surfactants with linear or branched structure, including, but not limited to, ethoxylated fatty alcohols, ethoxylated castor oils, and alkyl glucosides with a hydrocarbon chain of at least 8 carbon atoms and mole % of ethoxylation of 5 or more. Additional surfactants are described herein. Non-limiting examples of second types of surfactants include adsorption modifiers, foamers, surface tension lowering enhancers, and emulsion breaking additives. Specific examples of such surfactants include cationic surfactants with a medium chain length, linear or branched anionic surfactants, amine oxides, amphoteric surfactants, silicone based surfactants, alkoxylated novolac resins (e.g. alkoxylated phenolic resins), alkoxylated polyimines, alkoxylated polyamines, and fluorosurfactants.

In some embodiments, the emulsion or microemulsion is as described in U.S. Pat. No. 7,380,606 and entitled "Composition and Process for Well Cleaning," herein incorporated by reference.

I-A. Solvents

The microemulsion generally comprises a solvent. The solvent, or a combination of solvents, may be present in the microemulsion in any suitable amount. In some embodiments, the total amount of solvent present in the microemulsion is between about 1 wt % and about 99 wt %, or between about 2 wt % and about 90 wt %, or between about 1 wt % and about 60 wt %, or between about 2 wt % and about 60 wt %, or between about 1 and about 50 wt %, or between about 1 and about 30 wt %, or between about 5 wt % and about 40 wt %, or between about 5 wt % and about 30 wt %, or between about 2 wt % and about 25 wt %, or between about 5 wt % and about 25 wt %, or between about 60 wt % and about 95 wt %, or between about 70 wt % or about 95 wt %, or between about 75 wt % and about 90 wt %, or between about 80 wt % and about 95 wt %, versus the total microemulsion composition.

Those of ordinary skill in the art will appreciate that microemulsions comprising more than two types of solvents may be utilized in the methods, compositions, and systems described herein. For example, the microemulsion may comprise more than one or two types of solvent, for example, three, four, five, six, or more, types of solvents. In some embodiments, the microemulsion comprises a first type of solvent and a second type of solvent. The first type of solvent to the second type of solvent ratio in a microemulsion may be present in any suitable ratio. In some embodiments, the ratio of the first type of solvent to the second type of solvent by weight is between about 4:1 and 1:4, or between 2:1 and 1:2, or about 1:1.

I-A1. Hydrocarbon Solvents

In some embodiments, the solvent is an unsubstituted cyclic or acyclic, branched or unbranched alkane having 6-12 carbon atoms. In some embodiments, the cyclic or acyclic, branched or unbranched alkane has 6-10 carbon atoms. Non-limiting examples of unsubstituted acyclic unbranched alkanes having 6-12 carbon atoms include hexane, heptane, octane, nonane, decane, undecane, and dodecane. Non-limiting examples of unsubstituted acyclic branched alkanes having 6-12 carbon atoms include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), and isomers of ethylmethylpentane (e.g., 3-ethyl-2-methylpentane, 3-ethyl-3-methylpentane). Non-limiting examples of unsubstituted cyclic branched or unbranched alkanes having 6-12 carbon atoms, include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, cyclononane, methylcyclooctane, dimethylcycloheptane, ethylcycloheptane, trimethylcyclohexane, ethylmethylcyclohexane, propylcyclohexane, and cyclodecane. In a particular embodiment, the unsubstituted cyclic or acyclic, branched or unbranched alkane having 6-12 carbon is selected from the group consisting of heptane, octane, nonane, decane, 2,2,4-trimethylpentane (isooctane), and propylcyclohexane.

In some embodiments, the solvent is an unsubstituted acyclic branched or unbranched alkene having one or two double bonds and 6-12 carbon atoms. In some embodiments, the solvent is an unsubstituted acyclic branched or unbranched alkene having one or two double bonds and 6-10 carbon atoms. Non-limiting examples of unsubstituted acyclic unbranched alkenes having one or two double bonds and 6-12 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, and isomers of dodecadiene. In some embodiments, the acyclic unbranched alkene having one or two double bonds and 6-12 carbon atoms is an alpha-olefin (e.g., 1-hexene, 1-heptene, 1-octene, 1-nonene, 1-decene, 1-undecene, 1-dodecene). Non-limiting examples unsubstituted acyclic branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylhexptene, and isomers of methylethylheptene. In a particular embodiment, the unsubstituted acyclic unbranched alkene having one or two double bonds and 6-12 carbon atoms is selected from the group consisting of 1-octene and 1,7-octadiene.

In some embodiments, the solvent is a cyclic or acyclic, branched or unbranched alkane having 9-12 carbon atoms and substituted with only an —OH group. Non-limiting examples of cyclic or acyclic, branched or unbranched alkanes having 9-12 carbon atoms and substituted with only an —OH group include isomers of nonanol, isomers of decanol, isomers of undecanol, and isomers of dodecanol. In a particular embodiment, the cyclic or acyclic, branched or unbranched alkane having 9-12 carbon atoms and substituted with only an —OH group is selected from the group consisting of 1-nonanol and 1-decanol.

In some embodiments, the solvent is a branched or unbranched dialkylether compound having the formula $C_nH_{2n+1}OC_mH_{2m+1}$ wherein n+m is between 6 and 16. In some cases, n+m is between 6 and 12, or between 6 and 10, or between 6 and 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialklyether is an isomer $C_6H_{13}OC_6H_{13}$ (e.g., dihexylether).

In some embodiments, the solvent is an aromatic solvent having a boiling point between about 300-400° F. Non-limiting examples of aromatic solvents having a boiling point between about 300-400° F. include butylbenzene, hexylbenzene, mesitylene, light aromatic naphtha, and heavy aromatic naphtha.

In some embodiments, the solvent is a bicyclic hydrocarbon solvent with varying degrees of unsaturation including fused, bridgehead, and spirocyclic compounds. Non-limiting examples of bicyclic solvents include isomers of decalin, tetrahydronapthalene, norbornane, norbornene, bicyclo[4.2.0] octane, bicyclo[3.2.1] octane, and spiro[5.5] dodecane.

In some embodiments, the solvent is a bicyclic hydrocarbon solvent with varying degrees of unsaturation and containing at least one O, N, or S atom including fused, bridgehead, and spirocyclic compounds. Non-limiting examples include isomers of 7 oxabicyclo[2.2.1] heptane, 4,7-epoxyisobenzofuran-1,3-dione, and 7 oxabicyclo[2.2.1] heptane-2,3-dicarboxylic acid, 2,3-dimethyl ester.

In some embodiments, the solvent is a cyclic or acyclic, branched or unbranched alkane having 8 carbon atoms and substituted with only an —OH group. Non-limiting examples of cyclic or acyclic, branched or unbranched alkanes having 8 carbon atoms and substituted with only an —OH group include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, and isomers of trimethylpentanol. In a particular embodiment, the cyclic or acyclic, branched or unbranched alkane having 8 carbon atoms and substituted with only an —OH group is selected from the group consisting of 1-octanol and 2-ethyl-1-hexanol.

I-A2. Amine and Amide Solvents

In some embodiments, the amine is of the formula $NR^1R^2R^3$, wherein $R^1$, $R^2$, and $R^3$ are the same or different and are hydrogen or cyclic or acyclic, branched or unbranched alkyl (e.g., $C_{1-16}$ alkyl), optionally substituted, or optionally, any two of $R^1$, $R^2$ and $R^3$ are joined together to form a ring. In some embodiments, each of $R^1$, $R^2$, and $R^3$ are the same or different and are hydrogen or cyclic or acyclic, branched or unbranched alkyl, or optionally, any two of $R^1$, $R^2$ and $R^3$ are joined together to form a ring, provide at least one of $R^1$, $R^2$, and $R^3$ is methyl or ethyl. In some cases, $R^1$ is cyclic or acyclic, branched or unbranched $C_1$-$C_6$ alkyl and $R^2$ and $R^3$ are the same or different and are hydrogen or cyclic or acyclic, branched or unbranched alkyl (e.g., $C_{8-16}$ alkyl), or optionally, $R^2$ and $R^3$ may be joined together to form a ring. In some cases, $R^1$ is methyl or ethyl and $R_2$ and $R_3$ are the same or different and are hydrogen or cyclic or acyclic, branched or unbranched alkyl (e.g., $C_{8-16}$ alkyl), or optionally, $R^2$ and $R^3$ may be joined together to form a ring. In some cases, $R^1$ is methyl and $R^2$ and $R^3$ are the same or different and are hydrogen or cyclic or acyclic, branched or unbranched alkyl (e.g., $C_{8-16}$ alkyl), or optionally, $R^2$ and $R^3$ may be joined together to form a ring. In some cases, $R^1$ and $R^2$ are the same or different and are hydrogen or cyclic or acyclic, branched or unbranched $C_1$-$C_6$ alkyl and $R^3$ is branched or unbranched alkyl (e.g., $C_{8-16}$ alkyl). In some cases, $R^1$ and $R^2$ are the same or different and are methyl or ethyl and $R^3$ is hydrogen or cyclic or acyclic, branched or unbranched alkyl (e.g., $C_{8-16}$ alkyl). In some cases, $R^1$ and $R^2$ are methyl and $R^3$ is hydrogen or cyclic or acyclic, branched or unbranched alkyl (e.g., $C_{8-16}$ alkyl).

In some embodiments, the amine is of the formula $NR^1R^2R^3$, wherein $R^1$, $R^2$, and $R^3$ are the same or different and are cyclic or acyclic, branched or unbranched alkyl (e.g., $C_{1-16}$ alkyl), optionally substituted, or optionally, any two of $R^1$, $R^2$ and $R^3$ are joined together to form a ring. In some embodiments, each of $R^1$, $R^2$, and $R^3$ are the same or different and are cyclic or acyclic, branched or unbranched alkyl, or optionally, any two of $R^1$, $R^2$ and $R^3$ are joined together to form a ring, provide at least one of $R^1$, $R^2$, and $R^3$ is methyl or ethyl. In some cases, $R^1$ is cyclic or acyclic, branched or unbranched $C_1$-$C_6$ alkyl and $R^2$ and $R^3$ are the same or different and are cyclic or acyclic, branched or unbranched alkyl (e.g., $C_{8-16}$ alkyl), or optionally, $R^2$ and $R^3$ may be joined together to form a ring. In some cases, $R^1$ is methyl or ethyl and $R_2$ and $R_3$ are the same or different and are cyclic or acyclic, branched or unbranched alkyl (e.g., $C_{8-16}$ alkyl), or optionally, $R^2$ and $R^3$ may be joined together to form a ring. In some cases, $R^1$ is methyl and $R^2$ and $R^3$ are the same or different and are cyclic or acyclic, branched or unbranched alkyl (e.g., $C_{8-16}$ alkyl), or optionally, $R^2$ and $R^3$ may be joined together to form a ring. In some cases, $R^1$ and $R^2$ are the same or different and are cyclic or acyclic, branched or unbranched $C_1$-$C_6$ alkyl and $R^3$ is branched or unbranched alkyl (e.g., $C_{8-16}$ alkyl). In some cases, $R^1$ and $R^2$ are the same or different and are methyl or ethyl and $R^3$ is cyclic or acyclic, branched or unbranched alkyl (e.g., $C_{8-16}$ alkyl). In some cases, $R^1$ and $R^2$ are methyl and $R^3$ is cyclic or acyclic, branched or unbranched alkyl (e.g., $C_{8-16}$ alkyl).

In some embodiments, the amine is of the formula $NR^1R^2R^3$, wherein $R^1$ is methyl and $R^2$ and $R^3$ are the same or different and are hydrogen or cyclic or acyclic, branched or unbranched $C_{8-16}$ alkyl, or optionally $R^2$ and $R^3$ are joined together to form a ring. Non-limiting examples of amines include isomers of N-methyl-octylamine, isomers of N-methyl-nonylamine, isomers of N-methyl-decylamine, isomers of N methylundecylamine, isomers of N-methyldodecylamine, isomers of N methyl teradecylamine, and isomers of N-methyl-hexadecylamine. In certain embodiments, the amine is selected from the group consisting of N methyldecylamine and N methylhexadecylamine.

In some embodiments, the amine is of the formula $NR^1R^2R^3$, wherein $R^1$ is methyl and $R^2$ and $R^3$ are the same or different and are cyclic or acyclic, branched or unbranched $C_{8-16}$ alkyl, or optionally $R^2$ and $R^3$ are joined together to form a ring. In some embodiments, the amine is of the formula $NR^1R^2R^3$, wherein $R^1$ is methyl and $R^2$ and $R^3$ are the same or different and are cyclic or acyclic, branched or unbranched $C_{8-16}$ alkyl, or optionally $R^2$ and $R^3$ are joined together to form a ring. Non-limiting examples of amines include isomers of N-methyl-N-octyloctylamine, isomers of N-methyl-N-nonylnonylamine, isomers of N-methyl-N-decyldecylamine, isomers of N-methyl-N-undecylundecylamine, isomers of N-methyl-N-dodecyldodecylamine, isomers of N-methyl-N-tetradecylteradecylamine, isomers of N-methyl-N-hexadecylhdexadecylamine, isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decyldodecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, and isomers of N-methyl-N-tetradecylhexadecylamine. In certain embodiments, the amine is selected from the group consisting of N-methyl-N-octyloctylamine, isomers of N-methyl-N-nonylnonylamine, isomers of N-methyl N-decyldecylamine, isomers of N-methyl-N-undecylundecylamine, isomers of N-methyl-N-dodecyldodecylamine, isomers of N-methyl-N-tetradecylteradecylamine, and isomers of N-methyl-N hexadecylhdexadecylamine. In certain embodiments, the amine is selected from the group consisting of N-methyl-N-dodecyldodecylamine and isomers of N-methyl-N hexadecylhexadecylamine. In certain embodiments, the amine is selected from the group consisting of isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N- nonyltetradecylamine, isomers of N-methyl-N-nonylhexadecylamine, isomers of N-methyl-N-decyldodecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, and isomers of N-methyl-N-tetradecylhexadecylamine. In certain embodiments, the cyclic or acyclic, branched or unbranched trisubstituted amines is selected from the group consisting of N-methyl-N-octyldodecylamine, N-methyl-N-octylhexadecylamine or N-methyl-N-dodecylhexadecylamine.

In certain embodiments, the amine is of the formula $NR^1R^2R^3$, wherein $R^1$ and $R^2$ are methyl and $R^3$ is cyclic or acyclic, branched or unbranched $C_{8-16}$ alkyl. Non-limiting examples of amines include isomers of N,N-dimethylnonylamine, isomers of N,N-dimethyldecylamine, isomers of N,N-dimethylundecylamine, isomers of N,N-dimethyldodecylamine, isomers of N,N-dimethyltetradecylamine, and isomers of N,N-dimethylhexadecylamine. In certain embodiments, the amine is selected from the group consisting of N,N-dimethyldecylamine, isomers of N,N-dodecylamine, and isomers of N,N-dimethylhexadecylamine.

In some embodiments, the amide is of the formula $N(C=OR^4)R^5R^6$, wherein $R^4$, $R^5$, and $R^6$ are the same or different and are hydrogen or cyclic or acyclic, branched or unbranched alkyl (e.g., $C_{1-16}$ alkyl), optionally substituted, or optionally, $R^5$ and $R^6$ are joined together to form a ring. In some embodiments, each of $R^4$, $R^5$, and $R^6$ are the same or different and are hydrogen or cyclic or acyclic, branched or unbranched alkyl (e.g., $C_{1-16}$ alkyl), optionally substituted, or optionally, $R^5$ and $R^6$ are joined together to form a ring, provided at least one of $R^4$, $R^5$, and $R^6$ is methyl or ethyl. In some cases, $R^4$ is hydrogen or cyclic or acyclic, branched or unbranched $C_1-C_6$ alkyl, optionally substituted, and $R^5$ and $R^6$ are the same or different and are hydrogen or cyclic or acyclic, branched or unbranched alkyl (e.g., $C_{8-16}$ alkyl), optionally substituted, or optionally, $R^5$ and $R^6$ may be joined together to form a ring. In some cases, $R^4$ is hydrogen, methyl, or ethyl and $R^5$ and $R^6$ are the same or different and are hydrogen or cyclic or acyclic, branched or unbranched alkyl (e.g., $C_{8-16}$ alkyl), optionally substituted, or optionally, $R^5$ and $R^6$ may be joined together to form a ring. In some cases, $R^4$ is hydrogen and $R^5$ and $R^6$ are the same or different and are cyclic or acyclic, branched or unbranched alkyl (e.g., $C_{8-16}$ alkyl), optionally substituted, or optionally, $R^5$ and $R^6$ may be joined together to form a ring. In some cases, $R^4$ and $R^5$ are the same or different and are hydrogen or cyclic or acyclic, branched or unbranched $C_1-C_6$ alkyl, optionally substituted, and $R^6$ is cyclic or acyclic, branched or unbranched alkyl (e.g., $C_{8-16}$ alkyl), optionally substituted. In some cases, $R^4$ and $R^5$ are the same or different and are hydrogen, methyl, or ethyl and $R^6$ is cyclic or acyclic, branched or unbranched alkyl (e.g., $C_{8-16}$ alkyl), optionally substituted. In some cases, $R^4$ and $R^5$ are hydrogen and $R^6$ is cyclic or acyclic, branched or unbranched alkyl (e.g., $C_{8-16}$ alkyl), optionally substituted. In some cases, $R^6$ is hydrogen or cyclic or acyclic, branched or unbranched $C_1-C_6$ alkyl, optionally substituted, and $R^4$ and $R^5$ are the same or different and are hydrogen or cyclic or acyclic, branched or unbranched alkyl (e.g., $C_{8-16}$ alkyl), optionally substituted, or optionally. In some cases, $R^6$ is hydrogen, methyl, or ethyl and $R^4$ and $R^5$ are the same or different and are hydrogen or cyclic or acyclic, branched or unbranched alkyl (e.g., $C_{8-16}$ alkyl), optionally substituted.

In some cases, $R^5$ and $R^6$ are the same or different and are hydrogen or cyclic or acyclic, branched or unbranched $C_1-C_6$ alkyl, optionally substituted, and $R^4$ is cyclic or acyclic, branched or unbranched alkyl (e.g., $C_{8-16}$ alkyl), optionally substituted. In some cases, $R^5$ and $R^6$ are the same or different and are hydrogen, methyl, or ethyl and $R^4$ is cyclic or acyclic, branched or unbranched alkyl (e.g., $C_{8-16}$ alkyl), optionally substituted. In some cases, $R^5$ and $R^6$ are hydrogen and $R^4$ is cyclic or acyclic, branched or unbranched alkyl (e.g., $C_{8-16}$ alkyl), optionally substituted.

In some embodiments, the amide is of the formula $N(C=OR^4)R^5R^6$, wherein $R^4$, $R^5$, and $R^6$ are the same or different and are cyclic or acyclic, branched or unbranched alkyl (e.g., $C_{1-16}$ alkyl), optionally substituted, or optionally, $R^5$ and $R^6$ are joined together to form a ring. In some embodiments, each of $R^4$, $R^5$, and $R^6$ are the same or different and are cyclic or acyclic, branched or unbranched alkyl (e.g., $C_{1-16}$ alkyl), optionally substituted, or optionally, $R^5$ and $R^6$ are joined together to form a ring, provided at least one of $R^4$, $R^5$, and $R^6$ is methyl or ethyl. In some cases, $R^4$ is cyclic or acyclic, branched or unbranched $C_1-C_6$ alkyl, optionally substituted, and $R^5$ and $R^6$ are the same or different and are hydrogen or cyclic or acyclic, branched or unbranched alkyl (e.g., $C_{8-16}$ alkyl), optionally substituted, or optionally, $R^5$ and $R^6$ may be joined together to form a ring. In some cases, $R^4$ is methyl or ethyl and $R^5$ and $R^6$ are the same or different and are cyclic or acyclic, branched or unbranched alkyl (e.g., $C_{8-16}$ alkyl), optionally substituted, or optionally, $R^5$ and $R^6$ may be joined together to form a ring. In some cases, $R^4$ is and $R^5$ and $R^6$ are the same or different and are cyclic or acyclic, branched or unbranched alkyl (e.g., $C_{8-16}$ alkyl), optionally substituted, or optionally, $R^5$ and $R^6$ may be joined together to form a ring. In some cases, $R^4$ is methyl and $R^5$ and $R^6$ are the same or different and are cyclic or acyclic, branched or unbranched alkyl (e.g., $C_{8-16}$ alkyl), optionally substituted, or optionally, $R^5$ and $R^6$ may be joined together to form a ring. In some cases, $R^4$ and $R^5$ are the same or different and are methyl or ethyl and $R^6$ is cyclic or acyclic, branched or unbranched alkyl (e.g., $C_{8-16}$ alkyl), optionally substituted. In some cases, $R^4$ and $R^5$ are methyl and $R^6$ is cyclic or acyclic, branched or unbranched alkyl (e.g., $C_{8-16}$ alkyl), optionally substituted. In some cases, $R^6$ is cyclic or acyclic, branched or unbranched $C_1-C_6$ alkyl, optionally substituted, and $R^4$ and $R^5$ are the same or different and are hydrogen or cyclic or acyclic, branched or unbranched alkyl (e.g., $C_{8-16}$ alkyl), optionally substituted, or optionally. In some cases, $R^6$ is methyl or ethyl and $R^4$ and $R^5$ are the same or different and are hydrogen or cyclic or acyclic, branched or unbranched alkyl (e.g., $C_{8-16}$ alkyl). In some cases, $R^6$ is methyl and $R^4$ and $R^5$ are the same or different and are cyclic or acyclic, branched or unbranched alkyl (e.g., $C_{8-16}$ alkyl), optionally substituted. In some cases, $R^5$ and $R^6$ are the same or different and are cyclic or acyclic, branched or unbranched $C_1-C_6$ alkyl, optionally substituted, and $R^4$ is cyclic or acyclic, branched or unbranched alkyl (e.g., $C_{8-16}$ alkyl), optionally substituted. In some cases, $R^5$ and $R^6$ are the same or different and are methyl or ethyl and $R^4$ is cyclic or acyclic, branched or unbranched alkyl (e.g., $C_{8-16}$ alkyl), optionally substituted. In some cases, $R^5$ and $R^6$ are methyl and $R^4$ is cyclic or acyclic, branched or unbranched alkyl (e.g., $C_{8-16}$ alkyl), optionally substituted.

In some embodiments, the amide is of the formula $N(C=OR^4)R^5R^6$, wherein each of $R^4$, $R^5$, and $R^6$ are the same or different and are cyclic or acyclic, branched or unbranched $C_{4-16}$ alkyl, optionally substituted, or optionally, $R^5$ and $R^6$ are joined together to form a ring. In some embodiments, the amide is of the formula $N(C=OR^4)R^5R^6$, wherein each of $R^4$, $R^5$, and $R^6$ are the same or different and are cyclic or acyclic, branched or unbranched $C_{8-16}$ alkyl, optionally substituted, or optionally, $R^5$ and $R^6$ are joined together to form a ring. In some embodiments, the amide is of the formula $N(C=OR^4)R^5R^6$, wherein each of $R^4$, $R^5$, and $R^6$ are the same or different and are selected from the group consisting of t-butyl and cyclic or acyclic, branched or unbranched $C_{5-16}$ alkyl, optionally substituted, or optionally, $R^5$ and $R^6$ are joined together to form a ring. In some embodiments, $R^4$, $R^5$, and $R^6$ are the same or different and are selected from the group consisting of t-butyl and cyclic or acyclic, branched or unbranched $C_{8-16}$ alkyl, optionally substituted, or optionally, $R^5$ and $R^6$ are joined together to form a ring. Non-limiting examples amides include N,N-dioctyloctamide, N,N-dinonylnonamide, N,N-didecyldecamide, N,N-didodecyldodecamide, N,N-diundecylundecamide, N,N-ditetradecyltetradecamide, N,N-dihexadecylhexadecamide, N,N-didecyloctamide, N,N-didodecyloctamide, N,N-dioctyldodecamide, N,N-didecyldodecamide, N,N-dioctylhexadecamide, N,N-didecylhexadecamide, and N,N-didodecylhexadecamide. In certain embodiments, the amide is selected from the group consisting of N,N-dioctyldodecamide and N,N-didodecyloctamide In some embodiments, the amide is of the formula $N(C=OR^4)R^5R^6$, wherein $R^6$ is hydrogen or $C_1$-$C_3$ alkyl and $R^4$ and $R^5$ are the same or different and are cyclic or acyclic, branched or unbranched $C_{4-16}$ alkyl, optionally substituted. In some embodiments, $R^6$ is selected from the group consisting of hydrogen, methyl, ethyl, propyl and isopropyl, and $R^4$ and $R^5$ are the same or different and are cyclic or acyclic, branched or unbranched $C_{4-16}$ alkyl, optionally substituted. In certain embodiments, $R^6$ is selected from the group consisting of hydrogen, methyl, ethyl, propyl and isopropyl, and $R^4$ and $R^5$ are the same or different and are cyclic or acyclic, branched or unbranched $C_{8-16}$ alkyl, optionally substituted. In some cases, at least one of $R^4$ and $R^5$ is substituted with a hydroxy group. In some embodiments, $R^6$ is selected from the group consisting of hydrogen, methyl, ethyl, propyl, and isopropyl, and $R^4$ and $R^5$ are the same or different and are selected from the group consisting of tert-butyl, cyclic or acyclic, branched or unbranched $C_{5-16}$ alkyl, optionally substituted, and cyclic or acyclic, branched or unbranched $C_{1-16}$ alkyl substituted with an —OH group.

In some embodiments, the amide is of the formula $N(C=OR^4)R^5R^6$, wherein $R^6$ is $C_1$-$C_3$ alkyl and $R^4$ and $R^5$ are the same or different and are cyclic or acyclic, branched or unbranched $C_{4-16}$ alkyl, optionally substituted. In some embodiments, $R^6$ is selected from the group consisting of methyl, ethyl, propyl and isopropyl, and $R^4$ and $R^5$ are the same or different and are cyclic or acyclic, branched or unbranched $C_{4-16}$ alkyl, optionally substituted. In certain embodiments, $R^6$ is selected from the group consisting of methyl, ethyl, propyl and isopropyl, and $R^4$ and $R^5$ are the same or different and are cyclic or acyclic, branched or unbranched $C_{8-16}$ alkyl, optionally substituted. In some cases, at least one of $R^4$ and $R^5$ is substituted with a hydroxy group. In some embodiments, $R^6$ is selected from the group consisting of methyl, ethyl, propyl, and isopropyl, and $R^4$ and $R^5$ are the same or different and are selected from the group consisting of tert-butyl, cyclic or acyclic, branched or unbranched $C_{5-16}$ alkyl, optionally substituted, and cyclic or acyclic, branched or unbranched $C_{1-16}$ alkyl substituted with an —OH group.

Non-limiting examples of amides include N,N-di-tert-butylformamide, N,N-dipentylformamide, N,N-dihexylformamide, N,N-diheptylformamide, N,N-dioctylformamide, N,N-dinonylformamide, N,N-didecylformamide, N,N-diundecylformamide, N,N-didodecylformamide, N,N-dihydroxymethylformamide, N,N-di-tert-butylacetamide, N,N-dipentylacetamide, N,N-dihexylacetamide, N,N-diheptylacetamide, N,N-dioctylacetamide, N,N-dinonylacetamide, N,N-didecylacetamide, N,N-diundecylacetamide, N,N-didodecylacetamide, N,N-dihydroxymethylacetamide, N,N-dimethylpropionamide, N,N-diethylpropionamide, N,N-dipropylpropionamide, such as N,N-di-n-propylpropionamide or N,N-diisopropylpropionamide, N,N-dibutylpropionamide, such as N,N-di-n-butylpropionamide, N,N-di-sec-butylpropionamide, N,N-diisobutylpropionamide or N,N-di-tert-butylpropionamide, N,N-dipentylpropionamide, N,N-dihexylpropionamide, N,N-diheptylpropionamide, N,N-dioctylpropionamide, N,N-dinonylpropionamide, N,N-didecylpropionamide, N,N-diundecylpropionamide, N,N-didodecylpropionamide, N,N-dimethyl-n-butyramide, N,N-diethyl-n-butyramide, N,N-dipropyl-n-butyramide, such as N,N-di-n-propyl-n-butyramide or N,N-diisopropyl-n-butyramide, N,N-dibutyl-n-butyramide, such as N,N-di-n-butyl-n-butyramide, N,N-di-sec-butyl-n-butyramide, N,N-diisobutyl-n-butyramide, N,N-di-tert-butyl-n-butyramide, N,N-dipentyl-n-butyramide, N,N-dihexyl-n-butyramide, N,N-diheptyl-n-butyramide, N,N-dioctyl-n-butyramide, N,N-dinonyl-n-butyramide, N,N-didecyl-n-butyramide, N,N-diundecyl-n-butyramide, N,N-didodecyl-n-butyramide, N,N-dipentylisobutyramide, N,N-dihexylisobutyramide, N,N-diheptylisobutyramide, N,N-dioctylisobutyramide, N,N-dinonylisobutyramide, N,N-didecylisobutyramide, N,N-diundecylisobutyramide, N,N-didodecylisobutyramide, N,N-pentylhexylformamide, N,N-pentylhexylacetamide, N,N-pentylhexylpropionamide, N,N-pentylhexyl-n-butyramide, N,N-pentylhexylisobutyramide, N,N-methylethylpropionamide, N,N-methyl-n-propylpropionamide, N,N-methylisopropylpropionamide, N,N-methyl-n-butylpropionamide, N,N-methylethyl-n-butyramide, N,N-methyl-n-propyl-n-butyramide, N,N-methylisopropyl-n-butyramide, N,N-methyl-n-butyl-n-butyramide, N,N-methylethylisobutyramide, N,N-methyl-n-propylisobutyramide, N,N-methylisopropylisobutyramide, and N,N-methyl-n-butylisobutyramide. In certain embodiments, the amide is selected from the group consisting of N,N-dioctyldodecacetamide, N,N-methyl-N-octylhexadecdidodecylacetamide, and N-methyl-N-ihexadecyldodecylhexadecacetamide.

In some embodiments, the amide is of the formula $N(C=OR^4)R^5R^6$, wherein $R^6$ is hydrogen or methyl and $R^4$ and $R^5$ are the same or different and are cyclic or acyclic, branched or unbranched $C_{8-16}$ alkyl. Non-limiting amides include isomers of N methyloctamide, isomers of N-methylnonamide, isomers of N-methyldecamide, isomers of N methylundecamide, isomers of N methyldodecamide, isomers of N methylteradecamide, and isomers of N-methylhexadecamide. In certain embodiments the amides are slected from the group consisteing of N methyloctamide, N methyldodecamide, and N methylhexadecamide.

In some embodiments, the amide is of the formula $N(C=OR^4)R^5R^6$, wherein $R^6$ is methyl and $R^4$ and $R^5$ are the same or different and are cyclic or acyclic, branched or unbranched $C_{8-16}$ alkyl. Non-limiting amides include isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, and isomers of N methyl-N-tetradecylhexadecamide. In certain embodiments, the amide is selected from the group consisting of isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, and isomers of N-methyl-N-hexadecylhdexadecamide. In certain embodiments, amide is selected from the group consisting of N-methyl-N-octyloctamide, N methyl-N-dodecyldodecamide, and N-methyl-N-hexadecylhexadecamide. In certain embodiments, the amide is selected from the group consisting of isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, and isomers of N methyl-N-tetradecylhexadecamide. In certain embodiments, the amides is selected from the group consisting of N-methyl-N-octyldodecamide, N-methyl-N-octylhexadecamide, and N-methyl-N-dodecylhexadecamide.

In some embodiments, the amide is of the formula $N(C=OR^4)R^5R^6$, wherein $R^5$ and $R^6$ are the same or different and are hydrogen or $C_1$-$C_3$ alkyl and $R^4$ is cyclic or acyclic, branched or unbranched $C_{4-16}$ alkyl, optionally substituted. In some embodiments, $R^5$ and $R^6$ are the same or different and are selected from the group consisting of hydrogen, methyl, ethyl, propyl and isopropyl, and $R^4$ is cyclic or acyclic, branched or unbranched $C_{4-16}$ alkyl, optionally substituted. In certain embodiments, $R^5$ and $R^6$ are the same or different and are selected from the group consisting of hydrogen, methyl, ethyl, propyl and isopropyl and $R^4$ is cyclic or acyclic, branched or unbranched $C_{8-16}$ alkyl, optionally substituted. In some cases, $R^4$ is substituted with a hydroxy group. In some embodiments, $R^5$ and $R^6$ are the same or different and are selected from the group consisting of hydrogen, methyl, ethyl, propyl, and isopropyl, and $R^4$ is selected from the group consisting of tert-butyl, cyclic or acyclic, branched or unbranched $C_{5-16}$ alkyl, optionally substituted, and cyclic or acyclic, branched or unbranched $C_{1-16}$ alkyl substituted with an —OH group.

In some embodiments, the amide is of the formula $N(C=OR^4)R^5R^6$, wherein $R^5$ and $R^6$ are the same or different and are $C_1$-$C_3$ alkyl and $R^4$ is cyclic or acyclic, branched or unbranched $C_{4-16}$ alkyl, optionally substituted. In some embodiments, $R^5$ and $R^6$ are the same or different and are selected from the group consisting of methyl, ethyl, propyl and isopropyl, and $R^4$ is cyclic or acyclic, branched or unbranched $C_{4-16}$ alkyl, optionally substituted. In certain embodiments, $R^5$ and $R^6$ are the same or different and are selected from the group consisting of methyl, ethyl, propyl and isopropyl and $R^4$ is cyclic or acyclic, branched or unbranched $C_{8-16}$ alkyl, optionally substituted. In some cases, $R^4$ is substituted with a hydroxy group. In some embodiments, $R^5$ and $R^6$ are the same or different and are selected from the group consisting of methyl, ethyl, propyl, and isopropyl, and $R^4$ is selected from the group consisting of tert-butyl, cyclic or acyclic, branched or unbranched $C_{5-16}$ alkyl, optionally substituted, and cyclic or acyclic, branched or unbranched $C_{1-16}$ alkyl substituted with an —OH group.

In some embodiments, the amide is of the formula $N(C=OR^4)R^5R^6$, wherein $R^5$ and $R^6$ are methyl and $R^4$ is cyclic or acyclic, branched or unbranched $C_{8-16}$ alkyl. Non-limiting examples of amides include isomers of N,N-dimethyloctamide, isomers of N,N-dimethylnonamide, isomers of N,N-dimethyldecamide, isomers of N,N-dimethylundecamide, isomers of N,N-dimethyldodecamide, isomers of N,N-dimethyltetradecamide, and isomers of N,N-dimethylhexadecamide. In certain embodiments, the cyclic or acyclic, branched or unbranched tri-substituted amines is selected from the group consisting of N,N-dimethyloctamide, N,N-dodecamide, and N,N-dimethylhexadecamide.

In some embodiments, the solvent is an aromatic solvent having a boiling point between about 175-300° F. Non-limiting examples of aromatic liquid solvents having a boiling point between about 175-300° F. include benzene, xylenes, and toluene. In a particular embodiment, the solvent is not xylene.

I-A3. Fatty Acid Ester Solvents

In some embodiments, at least one of the solvents present in the microemulsion is an ester of fatty acid, either naturally occurring or synthetic with the formula $R^7O(C=OR^8)$, wherein $R^7$ and $R^8$ are the same or different and are cyclic or acyclic, branched or unbranched alkyl (e.g., C1-16 alkyl), optionally substituted. In some embodiments, each of $R^7$ and $R^8$ are the same or different and are cyclic or acyclic, branched or unbranched alkyl, or optionally, provide at least one of $R^7$ and $R^8$ is methyl, ethyl, propyl, or butyl. Non-limiting examples include isomers of methyl octanoate, methyl decanoate, methyl dodecanoate, methyl undecanoate, methyl hexadecanoate, ethyl octanoate, ethyl decanoate, ethyl dodecanoate, ethyl undecanoate, ethyl hexadecanoate, propyl octanoate, propyl decanoate, propyl dodecanoate, propyl undecanoate, propyl hexadecanoate, butyl octanoate, butyl decanoate, butyl dodecanoate, butyl undecanoate, and butyl hexadecanoate. In certain embodiments, the esters are selected from the group consisting of methyl dodecanoate, methyl hexadecanoate, ethyl dodecanoate, ethyl hexadecanoate, propyl dodecanoate, propyl hexadecanoate, butyl dodecanoate, and butyl hexadecanoate. Non-limiting examples include isomers of octyl octanoate, nonyl, nonanoate, decyl decanoate, undecyl undecanoate, dodecyl decanoate, hexadecyl hexadecanoate. In certain embodiments the esters are selected from the group consisting of octyl octonoate and decyl decanoate.

I-A4. Terpene Solvents

In some embodiments, at least one of the solvents present in the microemulsion is a terpene or a terpenoid. In some embodiments, the terpene or terpenoid comprises a first type of terpene or terpenoid and a second type of terpene or terpenoid. Terpenes may be generally classified as monoterpenes (e.g., having two isoprene units), sesquiterpenes (e.g., having 3 isoprene units), diterpenes, or the like. The term terpenoid also includes natural degradation products, such as ionones, and natural and synthetic derivatives, e.g., terpene alcohols, aldehydes, ketones, acids, esters, epoxides, and hydrogenation products (e.g., see Ullmann's Encyclopedia of Industrial Chemistry, 2012, pages 29-45, herein incorporated by reference). It should be understood, that while much of the description herein focuses on terpenes, this is by no means limiting, and terpenoids may be employed where appropriate. In some cases, the terpene is a naturally occurring terpene. In some cases, the terpene is a non-naturally occurring terpene and/or a chemically modified terpene (e.g., saturated terpene, terpene amine, fluorinated terpene, or silylated terpene).

In some embodiments, the terpene is a monoterpene. Monoterpenes may be further classified as acyclic, monocyclic, and bicyclic (e.g., with a total number of carbons in the range between 18-20), as well as whether the monoterpene comprises one or more oxygen atoms (e.g., alcohol groups, ester groups, carbonyl groups, etc.). In some embodiments, the terpene is an oxygenated terpene, for example, a terpene comprising an alcohol, an aldehyde, and/or a ketone group. In some embodiments, the terpene comprises an alcohol group. Non-limiting examples of terpenes comprising an alcohol group are linalool, geraniol, nopol, α-terpineol, and menthol. In some embodiments, the terpene comprises an ether-oxygen, for example, eucalyptol, or a carbonyl oxygen, for example, menthone. In some embodiments, the terpene does not comprise an oxygen atom, for example, d-limonene.

Non-limiting examples of terpenes include linalool, geraniol, nopol, α-terpineol, menthol, eucalyptol, menthone, d-limonene, terpinolene, β-occimene, γ-terpinene, α-pinene, and citronellene. In a particular embodiment, the terpene is selected from the group consisting of α-terpeneol, α-pinene, nopol, and eucalyptol. In one embodiment, the terpene is nopol. In another embodiment, the terpene is eucalyptol. In some embodiments, the terpene is not limonene (e.g., d-limonene), the emulsion is free of limonene.

In some embodiments, the terpene is a non-naturally occurring terpene and/or a chemically modified terpene (e.g., saturated terpene). In some cases, the terpene is a partially or fully saturated terpene (e.g., p-menthane, pinane). In some cases, the terpene is a non-naturally occurring terpene. Non-limiting examples of non-naturally occurring terpenes include, menthene, p-cymene, r-carvone, terpinenes (e.g., alpha-terpinenes, beta-terpinenes, gamma-terpinenes), dipentenes, terpinolenes, borneol, alpha-terpinamine, and pine oils.

In some embodiments, the terpene is classified in terms of its phase inversion temperature (PIT). The term phase inversion temperature is given its ordinary meaning in the art and refers to the temperature at which an oil in water microemulsion inverts to a water in oil microemulsion (or vice versa). Those of ordinary skill in the art will be aware of methods for determining the PIT for a microemulsion comprising a terpene (e.g., see Strey, Colloid & Polymer Science, 1994. 272(8): p. 1005-1019; Kahlweit et al., Angewandte Chemie International Edition in English, 1985. 24(8): p. 654-668). The PIT values described herein were determined using a 1:1 ratio of terpene (e.g., one or more terpenes):de-ionized water and varying amounts (e.g., between about 20 wt % and about 60 wt %; generally, between 3 and 9 different amounts are employed) of a 1:1 blend of surfactant comprising linear $C_{12}$-$C_{15}$ alcohol ethoxylates with on average 7 moles of ethylene oxide (e.g., Neodol 25-7):isopropyl alcohol wherein the upper and lower temperature boundaries of the microemulsion region can be determined and a phase diagram may be generated. Those of ordinary skill in the art will recognize that such a phase diagram (e.g., a plot of temperature against surfactant concentration at a constant oil-to-water ratio) may be referred to as fish diagram or a Kahlweit plot. The temperature at the vertex is the PIT. An exemplary fish diagram indicating the PIT is shown in FIG. 1. PITs for non-limiting examples of terpenes determined using this experimental procedure outlined above are given in Table 1.

TABLE 1

Phase inversion temperatures for non-limiting examples of terpenes.

| Terpene | Phase Inversion Temperature ° F. (° C.) |
|---|---|
| linalool | 24.8 (−4) |
| geraniol | 31.1 (−0.5) |
| nopol | 36.5 (2.5) |
| α-terpineol | 40.3 (4.6) |
| menthol | 60.8 (16) |
| eucalyptol | 87.8 (31) |
| menthone | 89.6 (32) |
| d-limonene | 109.4 (43) |
| terpinolene | 118.4 (48) |
| β-occimene | 120.2 (49) |
| γ-terpinene | 120.2 (49) |
| α-pinene | 134.6 (57) |
| citronellene | 136.4 (58) |

I-A5. Crude Cut Solvents

In certain embodiments, the solvent utilized in the emulsion or microemulsion herein may comprise one or more impurities. For example, in some embodiments, a solvent (e.g., a terpene) is extracted from a natural source (e.g., citrus, pine), and may comprise one or more impurities present from the extraction process. In some embodiment, the solvent comprises a crude cut (e.g., uncut crude oil, for example, made by settling, separation, heating, etc.). In some embodiments, the solvent is a crude oil (e.g., naturally occurring crude oil, uncut crude oil, crude oil extracted from the wellbore, synthetic crude oil, crude citrus oil, crude pine oil, eucalyptus, etc.). In some embodiments, the solvent is a citrus extract (e.g., crude orange oil, orange oil, etc.).

I-A6. Mutual Solvents

In some embodiments, at least one of the solvents comprised in the emulsion or microemulsion comprising a mutual solvent which is miscible together with the water and the solvent. In some embodiments, the mutual solvent is present in an amount between about at 0.5 wt % to about 30% of mutual solvent. Non-limiting examples of suitable mutual solvents include ethyleneglycolmonobutyl ether (EGMBE), dipropylene glycol monomethyl ether, short chain alcohols (e.g., isopropanol), tetrahydrofuran, dioxane, dimethylformamide, and dimethylsulfoxide.

I-B. Aqueous Phase

Generally, the microemulsion comprises an aqueous phase. Generally, the aqueous phase comprises water. The water may be provided from any suitable source (e.g., sea water, fresh water, deionized water, reverse osmosis water, water from field production). The water may be present in any suitable amount. In some embodiments, the total amount of water present in the microemulsion is between about 1 wt % about 95 wt %, or between about 1 wt % about 90 wt %, or between about 1 wt % and about 60 wt %, or between about 5 wt % and about 60 wt % or between about 10 and about 55 wt %, or between about 15 and about 45 wt %, versus the total microemulsion composition.

The water to solvent ratio in a microemulsion may be varied. In some embodiments, the ratio of water to solvent, along with other parameters of the solvent may be varied. In some embodiments, the ratio of water to solvent by weight is between about 15:1 and 1:10, or between 9:1 and 1:4, or between 3.2:1 and 1:4.

I-C. Surfactants

In some embodiments, the microemulsion comprises a surfactant. The microemulsion may comprise a single surfactant or a combination of two or more surfactants. For example, in some embodiments, the surfactant comprises a first type of surfactant and a second type of surfactant. The term surfactant, as used herein, is given its ordinary meaning in the art and refers to compounds having an amphiphilic structure which gives them a specific affinity for oil/water-type and water/oil-type interfaces which helps the compounds to reduce the free energy of these interfaces and to stabilize the dispersed phase of a microemulsion. The term surfactant encompasses cationic surfactants, anionic surfactants, amphoteric surfactants, nonionic surfactants, zwitterionic surfactants, and mixtures thereof. In some embodiments, the surfactant is a nonionic surfactant. Nonionic surfactants generally do not contain any charges. Amphoteric surfactants generally have both positive and negative charges, however, the net charge of the surfactant can be positive, negative, or neutral, depending on the pH of the solution. Anionic surfactants generally possess a net negative charge. Cationic surfactants generally possess a net positive charge. Zwitterionic surfactants are generally not pH dependent. A zwitterion is a neutral molecule with a positive and a negative electrical charge, though multiple positive and negative charges can be present. Zwitterions are distinct from dipole, at different locations within that molecule.

In some embodiments, the surfactant is an amphiphilic block copolymer where one block is hydrophobic and one block is hydrophilic. In some cases, the total molecular weight of the polymer is greater than 5000 daltons. The hydrophilic block of these polymers can be nonionic, anionic, cationic, amphoteric, or zwitterionic.

The term surface energy, as used herein, is given its ordinary meaning in the art and refers to the extent of disruption of intermolecular bonds that occur when the surface is created (e.g., the energy excess associated with the surface as compared to the bulk). Generally, surface energy is also referred to as surface tension (e.g., for liquid-gas interfaces) or interfacial tension (e.g., for liquid-liquid interfaces). As will be understood by those skilled in the art, surfactants generally orient themselves across the interface to minimize the extent of disruption of intermolecular bonds (i.e. lower the surface energy). Typically, a surfactant at an interface between polar and non-polar phases orient themselves at the interface such that the difference in polarity is minimized.

Those of ordinary skill in the art will be aware of methods and techniques for selecting surfactants for use in the microemulsions described herein. In some cases, the surfactant(s) are matched to and/or optimized for the particular oil or solvent in use. In some embodiments, the surfactant(s) are selected by mapping the phase behavior of the microemulsion and choosing the surfactant(s) that gives the desired range of phase behavior. In some cases, the stability of the microemulsion over a wide range of temperatures is targeted as the microemulsion may be subject to a wide range of temperatures due to the environmental conditions present at the subterranean formation and/or reservoir.

The surfactant may be present in the microemulsion in any suitable amount. In some embodiments, the surfactant is present in an amount between about 0 wt % and about 99 wt %, or between about 1 wt % and about 90 wt %, or between about 0 wt % and about 60 wt %, or between about 1 wt % and about 60 wt %, or between about 5 wt % and about 60 wt %, or between about 10 wt % and about 60 wt %, or between about 5 wt % and about 65 wt %, or between about 5 wt % and about 55 wt %, or between about 10 wt % and about 55 wt %, or between about 2 wt % and about 50 wt %, or between about 0 wt % and about 40 wt %, or between about 15 wt % and about 55 wt %, or between about 20 wt % and about 50 wt %, versus the total microemulsion composition.

Suitable surfactants for use with the compositions and methods described herein will be known in the art. In some embodiments, the surfactant is an alkyl polyglycol ether, for example, having 2-250 ethylene oxide (EO) (e.g., or 2-200, or 2-150, or 2-100, or 2-50, or 2-40) units and alkyl groups of 4-20 carbon atoms. In some embodiments, the surfactant is an alkylaryl polyglycol ether having 2-250 EO units (e.g., or 2-200, or 2-150, or 2-100, or 2-50, or 2-40) and 8-20 carbon atoms in the alkyl and aryl groups. In some embodiments, the surfactant is an ethylene oxide/propylene oxide (EO/PO) block copolymer having 2-250 EO or PO units (e.g., or 2-200, or 2-150, or 2-100, or 2-50, or 2-40). In some embodiments, the surfactant is a fatty acid polyglycol ester having 6-24 carbon atoms and 2-250 EO units (e.g., or 2-200, or 2-150, or 2-100, or 2-50, or 2-40). In some embodiments, the surfactant is a polyglycol ether of hydroxyl-containing triglycerides (e.g., castor oil). In some embodiments, the surfactant is an alkylpolyglycoside of the general formula R"—O—$Z_n$, where R" denotes a linear or branched, saturated or unsaturated alkyl group having on average 8-24 carbon atoms and $Z_n$ denotes an oligoglycoside group having on average n=1-10 hexose or pentose units or mixtures thereof. In some embodiments, the surfactant is a fatty ester of glycerol, sorbitol, or pentaerythritol. In some embodiments, the surfactant is an amine oxide (e.g., dodecyldimethylamine oxide). In some embodiments, the surfactant is an alkyl sulfate, for example having a chain length of 8-18 carbon atoms, alkyl ether sulfates having 8-18 carbon atoms in the hydrophobic group and 1-40 ethylene oxide (EO) or propylene oxide (PO) units. In some embodiments, the surfactant is a sulfonate, for example, an alkyl sulfonate having 8-18 carbon atoms, an alkylaryl sulfonate having 8-18 carbon atoms, an ester or half ester of sulfosuccinic acid with monohydric alcohols or alkylphenols having 4-15 carbon atoms, or a multisulfonate (e.g., comprising two, three, four, or more, sulfonate groups). In some cases, the alcohol or alkylphenol can also be ethoxylated with 1-250 EO units (e.g., or 2-200, or 2-150, or 2-100, or 2-50, or 2-40). In some embodiments, the surfactant is an alkali metal salt or ammonium salt of a carboxylic acid or poly (alkylene glycol) ether carboxylic acid having 8-20 carbon atoms in the alkyl, aryl, alkaryl or aralkyl group and 1-250 EO or PO units (e.g., or 2-200, or 2-150, or 2-100, or 2-50, or 2-40). In some embodiments, the surfactant is a partial phosphoric ester or the corresponding alkali metal salt or ammonium salt, e.g., an alkyl and alkaryl phosphate having 8-20 carbon atoms in the organic group, an alkylether phosphate or alkarylether phosphate having 8-20 carbon atoms in the alkyl or alkaryl group and 1-250 EO units (e.g., or 2-200, or 2-150, or 2-100, or 2-50, or 2-40). In some embodiments, the surfactant is a salt of primary, secondary, or tertiary fatty amine having 8-24 carbon atoms with acetic acid, sulfuric acid, hydrochloric acid, and phosphoric acid. In some embodiments, the surfactant is a quaternary alkyl- and alkylbenzylammonium salt, whose alkyl groups have 1-24 carbon atoms (e.g., a halide, sulfate, phosphate, acetate, or hydroxide salt). In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt). In some embodiments, the surfactant is amphoteric or zwitterionic, including sultaines (e.g., cocamidopropyl hydroxysultaine), betaines (e.g., cocamidopropyl betaine), or phosphates (e.g., lecithin). Non-limiting examples of specific surfactants include a linear $C_{12}$-$C_{15}$ ethoxylated alcohols with 5-12 moles of EO, lauryl alcohol ethoxylate with 4-8 moles of EO, nonyl phenol ethoxylate with 5-9 moles of EO, octyl phenol ethoxylate with 5-9 moles of EO, tridecyl alcohol ethoxylate with 5-9 moles of EO, Pluronic® matrix of EO/PO copolymers, ethoxylated cocoamide with 4-8 moles of EO, ethoxylated coco fatty acid with 7-11 moles of EO, and cocoamidopropyl amine oxide.

In some embodiments, the surfactant is a siloxane surfactant as described in U.S. patent application Ser. No. 13/831,410, filed Mar. 14, 2014, herein incorporated by reference.

In some embodiments, the surfactant is a Gemini surfactant. Gemini surfactants generally have the structure of multiple amphiphilic molecules linked together by one or more covalent spacers. In some embodiments, the surfactant is an extended surfactant, wherein the extended surfactats has the structure where a non-ionic hydrophilic spacer (e.g. ethylene oxide or propylene oxide) connects an ionic hydrophilic group (e.g. carboxylate, sulfate, phosphate).

In some embodiments the surfactant is an alkoxylated polyimine with a relative solubility number (RSN) in the range of 5-20. As will be known to those of ordinary skill in the art, RSN values are generally determined by titrating water into a solution of surfactant in 1,4dioxane. The RSN values is generally defined as the amount of distilled water necessary to be added to produce persistent turbidity. In some embodiments the surfactant is an alkoxylated novolac resin (also known as a phenolic resin) with a relative solubility number in the range of 5-20. In some embodiments the surfactant is a block copolymer surfactant with a total molecular weight greater than 5000 daltons. The block copolymer may have a hydrophobic block that is comprised of a polymer chain that is linear, branched, hyperbranched, dendritic or cyclic. Non-limiting examples of monomeric repeat units in the hydrophobic chains of block copolymer surfactants are isomers of acrylic, methacrylic, styrenic, isoprene, butadiene, acrylamide, ethylene, propylene and norbornene. The block copolymer may have a hydrophilic block that is comprised of a polymer chain that is linear, branched, hyper branched, dendritic or cyclic. Non-limiting examples of monomeric repeat units in the hydrophilic chains of the block copolymer surfactants are isomers of acrylic acid, maleic acid, methacrylic acid, ethylene oxide, and acrylamine.

In some embodiments, the surfactant has a structure as in Formula I:

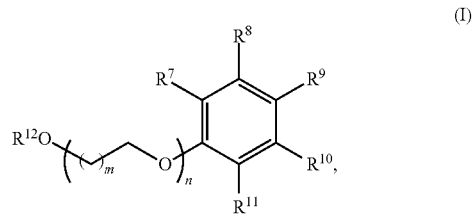

wherein each of $R^7$, $R^8$, $R^9$, $R^{10}$, and $R^{11}$ are the same or different and are selected froml the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $R^{12}$ is hydrogen or alkyl, n is 1-100, and each m is independently 1 or 2. In some embodiments, Ar is phenyl. In some embodiments, for a compound of Formula (I), $R^{12}$ is hydrogen or $C_{1-6}$ alkyl. In some embodiments, for a compound of Formula (I), $R^{12}$ is H, methyl, or ethyl. In some embodiments, for a compound of Formula (I), $R^{12}$ is H.

In some embodiments, the surfactant has a structure as in Formula II:

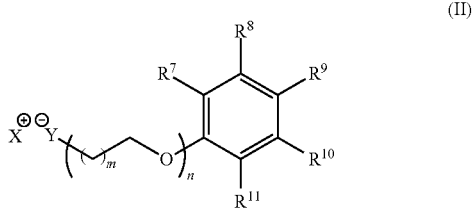

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $Y^-$ is an anionic group, $X^+$ is a cationic group, n is 1-100, and each m is independently 1 or 2. In some embodiments, Ar is phenyl. In some embodiments, for a compound of Formula (II), $X^+$ is a metal cation or $N(R^{13})_4$, wherein each $R^{13}$ is independently selected from the group consisting of hydrogen, optionally substituted alkyl, or optionally substituted aryl. In some embodiments, $X^+$ is $NH_4$. Non-limiting examples of metal cations are $Na^+$, $K^+$, $Mg^{+2}$, and $Ca^{+2}$. In some embodiments, for a compound of Formula (II), $Y^-$ is —$O^-$, —$SO_2O^-$, or —$OSO_2O^-$.

In some embodiments, the surfactant has a structure as in Formula III:

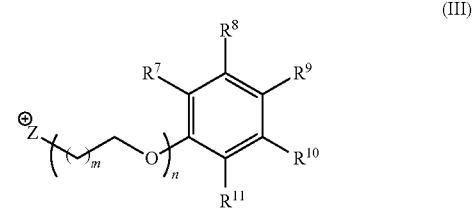

wherein each of $R^7$, $R^8$, $R^9$, $R^{10}$ and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $Z^+$ is a cationic group, n is 1-100, and each m is independently 1 or 2. In some embodiments, Ar is phenyl. In some embodiments, for a compound of Formula (III), $Z^+$ is $N(R^{13})_3$, wherein each $R^{13}$ is independent selected from the group consisting of hydrogen, optionally substituted alkyl, or optionally substituted aryl.

In some embodiments, for a compound of Formula (I), (II), or (III), two of $R^7$, $R^8$, $R^9$, $R^{10}$, and $R^{11}$ are —CH=CHAr. In some embodiments, for a compound of Formula (I), (II), or (III), one of $R^7$, $R^8$, $R^9$, $R^{10}$, and $R^{11}$ is —CH=CHAr and each of the other groups is hydrogen. In some embodiments, for a compound of Formula (I), (II), or (III), two of $R^7$, $R^8$, $R^9$, $R^{10}$, and $R^{11}$ are —CH=CHAr and each of the other groups is hydrogen. In some embodiments, for a compound of Formula (I), (II), or (III), $R^7$ and $R^8$ are —CH=CHAr and $R^9$, $R^{10}$, and $R^{11}$ are each hydrogen. In some embodiments, for a compound of Formula (I), (II), or (III), three of $R^7$, $R^8$, $R^9$, $R^{10}$, and $R^{11}$ are —CH=CHAr and each of the other groups is hydrogen. In some embodiments, for a compound of Formula (I), (II), or (III), $R^7$, $R^8$, and $R^9$ are —CH=CHAr and $R^{10}$ and $R^{11}$ are each hydrogen. In embodiments, for a compound of Formula (I), (II), or (III), Ar is phenyl. In some embodiments, for a compound of Formula (I), (II), or (III), each m is 1. In some embodiments, for a compound of Formula (I), (II), or (III), each m is 2. In some embodiments, for a compound of Formula (I), (II), or (III), n is 6-100, or 1-50, or 6-50, or 6-25, or 1-25, or 5-50, or 5-25, or 5-20.

In some embodiments, an emulsion or microemulsion comprises a surfactant of Formula (I), (II), or (III) in an amount between about 1 wt % and about 20 wt %, or between about 3 wt % and about 15 wt %, or between about 5 wt % and about 13 wt %, or between about 5 wt % and about 11 wt %, or between about 7 wt % and about 11 wt %, or between about 10 wt % and about 12 wt %, or between about 8 wt % and about 12 wt %, or between about 8 wt % and about 10 wt %, or about 9 wt %. In some embodiments, the emulsion or microemulsion comprises, in addition to the surfactant of Formula (I), (II), or (III), water and a non-aqueous phase (e.g., a terpene), and optionally other additives (e.g., one or more additional surfactants, an alcohol, a freezing point depression agent, etc.). In some embodiments, the emulsion or microemulsion comprises, in addition to the surfactant of Formula (I), (II), or (III), water, a terpene, an alcohol, one or more additional surfactants, and optionally other additives (e.g., a freezing point depression agent). In some embodiments, the emulsion or microemulsion comprises, in addition to the surfactant of Formula (I), (II), or (III), between about 20 wt % and 90 wt % water, between about 2 wt % and about 70 wt % of one or more additional surfactants, between about 1 wt % and about 80 wt % of a solvent (e.g., terpene), and between about 10 wt % and about 40 wt % of a mutual solvent (e.g., alcohol). In some embodiments, the emulsion or microemulsion comprises, in addition to the surfactant of Formula (I), (II), or (III), between about 10 wt % and 80 wt % water, between about 2 wt % and about 80 wt % of one or more additional surfactants, between about 1 wt % and about 70 wt % of a solvent (e.g., terpene), and between about 5 wt % and about 40 wt % of a mutual solvent (e.g., alcohol). In some embodiments, the emulsion or microemulsion comprises, in addition to the surfactant of Formula (I), (II), or (III), between about 20 wt % and 90 wt % water, between about 2 wt % and about 70 wt % of one or more additional surfactants, between about 1 wt % and about 78 wt % of a solvent (e.g., terpene), and between about 22 wt % and about 40 wt % of a mutual solvent (e.g., alcohol). Non-limiting examples of surfactants of Formula (I), (II), or (III) include styrylphenol ethoxylate, a tristyrylphenol ethoxylate, a styrylphenol propoxylate, a tristyrylphenol propoxylate, a styrylphenol ethoxylate propoxylate, or a tristyrylphenol ethoxylate propoxylate.

I-D. Additives

In some embodiments, the emulsion or microemulsion may comprise one or more additives in addition to water, solvent (e.g., one or more types of solvents), and surfactant (e.g., one or more types of surfactants). In some embodiments, the additive is an alcohol, a freezing point depression agent, an acid, a salt, a proppant, a scale inhibitor, a friction reducer, a biocide, a corrosion inhibitor, a buffer, a viscosifier, a clay swelling inhibitor, an oxygen scavenger, and/or a clay stabilizer.

I-D1. Alcohol

In some embodiments, the microemulsion comprises an alcohol. The alcohol may serve as a coupling agent between the solvent and the surfactant and aid in the stabilization of the microemulsion. The alcohol may also lower the freezing point of the microemulsion. The microemulsion may comprise a single alcohol or a combination of two or more alcohols. In some embodiments, the alcohol is selected from primary, secondary and tertiary alcohols having between 1 and 20 carbon atoms. In some embodiments, the alcohol comprises a first type of alcohol and a second type of alcohol. Non-limiting examples of alcohols include methanol, ethanol, isopropanol, n-propanol, n-butanol, i-butanol, sec-butanol, iso-butanol, and t-butanol. In some embodiments, the alcohol is ethanol or isopropanol. In some embodiments, the alcohol is isopropanol.

The alcohol may be present in the emulsion in any suitable amount. In some embodiments, the alcohol is present in an amount between about 0 wt % and about 50 wt %, or between about 0.1 wt % and about 50 wt %, or between about 1 wt % and about 50 wt %, or between about 2 wt % and about 50 wt % or between about 5 wt % and about 40 wt %, or between about 5 wt % and 35 wt %, versus the total microemulsion composition.

I-D2. Freezing Point Depression Agents

In some embodiments, the microemulsion comprises a freezing point depression agent. The microemulsion may comprise a single freezing point depression agent or a combination of two or more freezing point depression agents. For example, in some embodiments, the freezing point depression agent comprises a first type of freezing point depression agent and a second type of freezing point depression agent. The term freezing point depression agent is given its ordinary meaning in the art and refers to a compound which is added to a solution to reduce the freezing point of the solution. That is, a solution comprising the freezing point depression agent has a lower freezing point as compared to an essentially identical solution not comprising the freezing point depression agent. Those of ordinary skill in the art will be aware of suitable freezing point depression agents for use in the microemulsions described herein. Non-limiting examples of freezing point depression agents include primary, secondary, and tertiary alcohols with between 1 and 20 carbon atoms. In some embodiments, the alcohol comprises at least 2 carbon atoms, alkylene glycols including polyalkylene glycols, and salts. Non-limiting examples of alcohols include methanol, ethanol, i-propanol, n-propanol, t-butanol, n-butanol, n-pentanol, n-hexanol, and 2-ethyl-hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). In some embodiments, the freezing point depression agent comprises an alcohol and an alkylene glycol. In some embodiments, the freezing point depression agent comprises a carboxycyclic acid salt and/or a di-carboxycylic acid salt. Another non-limiting example of a freezing point depression agent is a combination of choline chloride and urea. In some embodiments, the microemulsion comprising the freezing point depression agent is stable over a wide range of temperatures, for example, between about −50° F. to 200° F.

The freezing point depression agent may be present in the microemulsion in any suitable amount. In some embodiments, the freezing point depression agent is present in an amount between about 0 wt % and about 70 wt %, or between about 0.5 and 30 wt %, or between about 1 wt % and about 40 wt %, or between about 0 wt % and about 25 wt %, or between about 1 wt % and about 25 wt %, or between about 1 wt % and about 20 wt %, or between about 3 wt % and about 20 wt %, or between about 8 wt % and about 16 wt %, versus the total microemulsion composition.

I-E. Other Additives

In addition to the alcohol and the freezing point depression agent, the microemulsion may comprise other additives. For example, the microemulsion may comprise an acid and/or a salt. Further non-limiting examples of other additives include proppants, scale inhibitors, friction reducers, biocides, corrosion inhibitors, buffers, viscosifiers, clay swelling inhibitors, paraffin dispersing additives, asphaltene dispersing additives, and oxygen scavengers.

Non-limiting examples of proppants (e.g., propping agents) include grains of sand, glass beads, crystalline silica (e.g., Quartz), hexamethylenetetramine, ceramic proppants (e.g., calcined clays), resin coated sands, and resin coated ceramic proppants. Other proppants are also possible and will be known to those skilled in the art.

Non-limiting examples of scale inhibitors include one or more of methyl alcohol, organic phosphonic acid salts (e.g., phosphonate salt), polyacrylate, ethane-1,2-diol, calcium chloride, and sodium hydroxide. Other scale inhibitors are also possible and will be known to those skilled in the art.

Non-limiting examples of buffers include acetic acid, acetic anhydride, potassium hydroxide, sodium hydroxide, and sodium acetate. Other buffers are also possible and will be known to those skilled in the art.

Non-limiting examples of corrosion inhibitors include isopropanol, quaternary ammonium compounds, thiourea/formaldehyde copolymers, propargyl alcohol and methanol. Other corrosion inhibitors are also possible and will be known to those skilled in the art.

Non-limiting examples of biocides include didecyl dimethyl ammonium chloride, gluteral, Dazomet, bronopol, tributyl tetradecyl phosphonium chloride, tetrakis (hydroxymethyl) phosphonium sulfate, AQUCAR™, UCAR-CIDE™, glutaraldehyde, sodium hypochlorite, and sodium hydroxide. Other biocides are also possible and will be known to those skilled in the art.

Non-limiting examples of clay swelling inhibitors include quaternary ammonium chloride and tetramethylammonium chloride. Other clay swelling inhibitors are also possible and will be known to those skilled in the art.

Non-limiting examples of friction reducers include petroleum distillates, ammonium salts, polyethoxylated alcohol surfactants, and anionic polyacrylamide copolymers. Other friction reducers are also possible and will be known to those skilled in the art.

Non-limiting examples of oxygen scavengers include sulfites, and bisulfites. Other oxygen scavengers are also possible and will be known to those skilled in the art.

Non-limiting examples of paraffin dispersing additives and asphaltene dispersing additives include active acidic copolymers, active alkylated polyester, active alkylated polyester amides, active alkylated polyester imides, aromatic naphthas, and active amine sulfonates. Other paraffin dispersing additives are also possible and will be known to those skilled in the art.

In some embodiments, for the formulations above, the other additives are present in an amount between about 0 wt % about 70 wt %, or between about 0 wt % and about 30 wt %, or between about 1 wt % and about 30 wt %, or between about 1 wt % and about 25 wt %, or between about 1 and about 20 wt %, versus the total microemulsion composition.

I-E1. Acids

In some embodiments, the microemulsion comprises an acid or an acid precursor. For example, the microemulsion may comprise an acid when used during acidizing operations. The microemulsion may comprise a single acid or a combination of two or more acids. For example, in some embodiments, the acid comprises a first type of acid and a second type of acid. Non-limiting examples of acids or di-acids include hydrochloric acid, acetic acid, formic acid, succinic acid, maleic acid, malic acid, lactic acid, and hydrochloric-hydrofluoric acids. In some embodiments, the microemulsion comprises an organic acid or organic di-acid in the ester (or di-ester) form, whereby the ester (or diester) is hydrolyzed in the wellbore and/or reservoir to form the parent organic acid and an alcohol in the wellbore and/or reservoir. Non-limiting examples of esters or di-esters include isomers of methyl formate, ethyl formate, ethylene glycol diformate, α,α-4-trimethyl-3-cyclohexene-1-methylformate, methyl lactate, ethyl lactate, α,α-4-trimethyl 3-cyclohexene-1-methyllactate, ethylene glycol dilactate, ethylene glycol diacetate, methyl acetate, ethyl acetate, α,α,-4-trimethyl-3-cyclohexene-1-methylacetate, dimethyl succinate, dimethyl maleate, di(α,α-4-trimethyl-3-cyclohexene-1-methyl)succinate, 1-methyl-4-(1-methylethenyl)cyclohexylformate, 1-methyl-4-(1-ethylethenyl)cyclohexylactate, 1-methyl-4-(1-methylethenyl)cyclohexylacetate, di(1-methy-4-(1-methylethenyl)cyclohexyl)succinate.

I-E2. Salts

In some embodiments, the microemulsion comprises a salt. The presence of the salt may reduce the amount of water needed as a carrier fluid, and in addition, may lower the freezing point of the microemulsion. The microemulsion may comprise a single salt or a combination of two or more salts. For example, in some embodiments, the salt comprises a first type of salt and a second type of salt. Non-limiting examples of salts include salts comprising K, Na, Br, Cr, Cs, or Li, for example, halides of these metals, including NaCl, KCl, $CaCl_2$, and $MgCl_2$.

In some embodiments, the microemulsion comprises a clay stabilizer. The microemulsion may comprise a single clay stabilizer or a combination of two or more clay stabilizers. For example, in some embodiments, the salt comprises a first type of clay stabilizer and a second type of clay stabilizer. Non-limiting examples of clay stabilizers include salts above, polymers (PAC, PHPA, etc), glycols, sulfonated asphalt, lignite, sodium silicate, and choline chloride.

I-F. Formation and Use of Microemulsions

In some embodiments, the components of the microemulsion and/or the amounts of the components are selected such that the microemulsion is stable over a wide-range of temperatures. For example, the microemulsion may exhibit stability between about −40° F. and about 400° F., or between about −40° F. and about 300° F. or between about −40° F. and about 150° F. Those of ordinary skill in the art will be aware of methods and techniques for determining the range of stability of the microemulsion. For example, the lower boundary may be determined by the freezing point and the upper boundary may be determined by the cloud point and/or using spectroscopy methods. Stability over a wide range of temperatures may be important in embodiments where the microemulsions are being employed in applications comprising environments wherein the temperature may vary significantly, or may have extreme highs (e.g., desert) or lows (e.g., artic).

The microemulsions described herein may be formed using methods known to those of ordinary skill in the art. In some embodiments, the aqueous and non-aqueous phases may be combined (e.g., the water and the solvent(s)), followed by addition of a surfactant(s) and optionally (e.g., freezing point depression agent(s)) and agitation. The strength, type, and length of the agitation may be varied as known in the art depending on various factors including the components of the microemulsion, the quantity of the microemulsion, and the resulting type of microemulsion formed. For example, for small samples, a few seconds of gentle mixing can yield a microemulsion, whereas for larger samples, longer agitation times and/or stronger agitation may be required. Agitation may be provided by any suitable source, for example, a vortex mixer, a stirrer (e.g., magnetic stirrer), etc.

Any suitable method for injecting the microemulsion (e.g., a diluted microemulsion) into a wellbore may be employed. For example, in some embodiments, the microemulsion, optionally diluted, may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the microemulsion for a suitable period of time. The microemulsion and/or other fluids may be removed from the well using known techniques, including producing the well.

It should be understood, that in embodiments where a microemulsion is said to be injected into a wellbore, that the microemulsion may be diluted and/or combined with other liquid component(s) prior to and/or during injection (e.g., via straight tubing, via coiled tubing, etc.). For example, in some embodiments, the microemulsion is diluted with an aqueous carrier fluid (e.g., water, brine, sea water, fresh water, or a well-treatment fluid (e.g., an acid, a fracturing fluid comprising polymers, produced water, sand, slickwater, etc.,)) prior to and/or during injection into the wellbore. In some embodiments, a composition for injecting into a wellbore is provided comprising a microemulsion as described herein and an aqueous carrier fluid, wherein the microemulsion is present in an amount between about 0.1 and about 50 gallons per thousand gallons (gpt) per dilution fluid, or between 0.1 and about 100 gpt, or between about 0.5 and about 10 gpt, or between about 0.5 and about 2 gpt.

II. Applications of the Emulsions and/or Microemulsions Relating to the Life Cycle of a Well The emulsions and microemulsions described herein may be used in various aspects of the life cycle of an oil and/or gas well, including, but not limited to, drilling, mud displacement, casing, cementing, perforating, stimulation, enhanced oil recovery/improved oil recovery, etc.). Inclusion of an emulsion or microemulsion into the fluids typically employed in these processes, for example, drilling fluids, mud displacement fluids, casing fluids, cementing fluids, perforating fluid, stimulation fluids, kill fluids, etc., results in many advantages as compared to use of the fluid alone.

Various aspects of the well life cycle are described in detail below. As will be understood by those of ordinary skill in the art, while certain steps of the life cycle described below are described in sequential order, this is by no means limiting, and the steps may be carried out in a variety of orders. In addition, in some embodiments, each step may occur more than once in the life cycle of the well. For example, fracturing may be followed by stimulations, followed by additional fracturing steps. In some embodiments, refracturing, or the process of repeating the above stimulation processes, is further improved by the addition of an emulsion or microemulsion to the stimulation fluid.

II-A. Drilling

As will be known to those skilled in the art, drilling to form wellbores typically requires the displacement (e.g., using a drill pipe and a drill bit) of reservoir material (e.g., rock, sand, stone, or the like). Such drilling generally requires the use of certain drilling fluids which may, for example, lubricate and/or cool the drill bit, assist in the removal of earth (e.g., cuttings), create and/or balance hydrostatic head pressure (e.g., to prevent, for example, a collapse of the hole being formed by the drill bit, to control the flow of hydrocarbons and/or water into the wellbore, to decrease swelling of the surrounding reservoir material), and/or to control or prevent a kick (e.g., an explosive moving of drilling fluid back to the surface). Non-limiting examples of drilling fluids include water-based systems, oil-based systems (e.g., synthetic oil-based systems, low viscosity oils such as diesel, crude oil, etc.). In water-based systems, the water may comprise one or more additives, for example, salts (e.g., to form brine), solid particles, etc. In oil-based systems, the oil can comprise any oil including, by not limited to, mineral oil, esters, and alpha-olefins. In some embodiments, the drilling fluid comprises a foam or a mist. In certain embodiments, the drilling fluid is a water-based system. In some embodiments, drilling fluids include one or more minerals or additives (e.g., hematite, montmorillionite, barite, bentonite, ilmenite, lignite, lignosulfonate, slacked lime, sodium hydroxide, etc.).

In some embodiments, the drilling fluid comprises an emulsion or microemulsion. Emulsions and microemulsions are described in more detail herein. The addition of an additional emulsion or microemulsion in the drilling fluid may have many advantages as compared to the use of a drilling fluid alone, including, for example, decreasing the swelling of the surrounding reservoir, changing (e.g., increasing or decreasing) the viscosity of the drilling fluid, decreasing the amount of water absorbed into the well during the drilling process, increasing the amount of water extracted from the reservoir, changing (e.g., increasing and/or decreasing) the amount of contaminants and/or particulates extracted from the reservoir, and/or increasing the amount of oil and/or gas extracted from the reservoir. In some embodiments, the oil and/or gas comprises an oil and/or gas condensate. As will be known to those of ordinary skill in the art, in some cases, the composition of a drilling fluid may change during the process of drilling.

As will be known to those of ordinary skill in the art, imbibition is a nearly instantaneous process that occurs when water comes in contact with the exposed primary permeability of, for example, water wet shales and/or clays. This exposed primary permeability may be on the face of the drilled cuttings and borehole wall and/or along the faces of the naturally occurring micro-fractures (secondary permeability). In the case of secondary permeability, the overall depth of invasion into the formation may be directly related to the depth of the micro-fractures and the volume of whole water base fluid and/or filtrate allowed to imbibe into the micro-fractures. The speed of invasion of the available water base fluid or filtrate into the secondary permeability is generally related to the primary permeability features of capillary diameters and degree of saturation of the shales and/or clays. The addition of an emulsion or microemulsion in the drilling fluid may have advantages as compared to the use of a drilling fluid alone, including, for example, the controlling imbibition (e.g., prevention, reduction, or increase of imbibition).

In some embodiments, the drilling fluid comprises an emulsion or microemulsion as described herein wherein the emulsion or microemulsion is present in an amount between about 0.5 and about 200 gallons per thousand gallons (gpt) of drilling fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt. In certain embodiments, the emulsion or microemulsion is present in an amount between about 5 and about 10 gpt. In some embodiments, the drilling fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt, of an emulsion or a microemulsion. In some embodiments, the drilling fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

II-B. Mud Displacement

As will be known to those skilled in the art, generally following the drilling of a wellbore, techniques are utilized to stabilize the wellbore. Stabilizing the wellbore may include inserting a casing (e.g., metal sleeves, steel tubes, and the like) down the wellbore. In some cases, a cement is injected in the annulus between the wellbore and casing to add further stability. Prior to injecting cement, additional fluids (e.g., a mud displacement fluid) may be pushed between the casing and the wellbore sides to remove excess mud and/or filter cake. Generally, a mud displacement fluid refers to a fluid that displaces drilling mud. A mud displacement fluid is typically injected at high pressure into the inner core of the casing, and exits at the bottom of the casing, returning to the surface via the annular region between the casing and the sides of the wellbore. Alternatively, the mud displacement fluid may be injected at a high pressure between the casing and the sides of the wellbore and exits at the bottom of the casing, returning to the surface via the inner core of the casing. A non-limiting example of a mud displacement fluid includes a water-based system. In certain embodiments, the mud displacement fluid comprises water and one or more solvents, surfactants, and/or other additives known to those skilled in the art.

In some embodiments, the mud displacement fluid comprises an emulsion or microemulsion. Emulsions and microemulsions are described in more detail herein. The addition of an emulsion or microemulsion in the mud displacement fluid may have many advantages as compared to the use of a mud displacement fluid alone including, for example, preventing or minimizing damage from imbibition, assisting in liquification and removal of filter cakes, and/or preparing the hole for cementation. In addition, the presence of the emulsion or the microemulsion in the mud displacement fluid may result in improved (e.g., increased) delivery of the fluid to portions of the well, which aids in displacing surface contamination, which can result in less imbibition, formation blockages, and/or improves surfaces for cementing.

In some embodiments, the mud displacement fluid comprises an emulsion or microemulsion as described herein wherein the emulsion or microemulsion is present in an amount between about 0.5 and about 200 gpt of mud displacement fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10 gpt. In some embodiments, the emulsion or microemulsion is present in an amount between about 1 and about 4 gpt. In some embodiments, the mud displacement fluid contains at least about 0.5 gpt, at least about 1 gpt, or at least about 2 gpt, or at least about 4 gpt, or at least about 10 gpt, or at least about 20 gpt, or at least about 50 gpt, or at least about 100 gpt, or at least about 200 gpt of an emulsion or a microemulsion. In some embodiments, the mud displacement fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

II-C. Cementing

As described herein, and as will be known to those skilled in the art, generally following drilling a wellbore, cement is placed between the casing and the wellbore sides. At various stages of the cementing process (e.g., during preflush, during preliminary cementing, during remedial cementing, etc.), pieces of cement (e.g., cement particles, ground cement, etc.) may alter the reservoir material or fluid present in the wellbore (e.g., gelling the mud such that the viscosity is significantly increased and rendering it generally unworkable), the viscosity of fluids injected into the wellbore, and/or the viscosity of fluids recovered from the wellbore. For example, following the cementing process, a portion of the cement (e.g., at the bottom of the well, also known as a cement plug) may be removed by drilling, thereby resulting in pieces of cement. The pieces of cement may be removed via injection of a fluid (e.g., a cementing fluid) during and/or following the cementing process.

In some embodiments, the cementing fluid comprises an emulsion or microemulsion. Emulsions and microemulsions are described in more detail herein. The addition of an emulsion or microemulsion in the cementing fluid may have many advantages as compared to the use of a cementing fluid alone including, for example, reducing the viscosity of fluids containing cement particles.

In some embodiments, the cementing fluid comprises an emulsion or microemulsion as described herein wherein the emulsion or microemulsion is present in an amount between about 0.5 and about 200 gpt of cementing fluid, or between about 0.5 and about 50 gpt, or between about 0.5 and about 100 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10 gpt. In some embodiments, the cementing fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt, of an emulsion or a microemulsion. In some embodiments, the cementing fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

II-D. Perforating

As will be known to those skilled in the art, generally following drilling and inserting a casing into a wellbore, perforating guns may be lowered into the wellbore to create holes between the interior of the casing and the surrounding reservoir material. Typically, perforating guns utilize liquid jets (e.g., hydrocutters) or explosives (e.g., an expanding plume of gas) to send high velocity jets of fluid (e.g., a perforating fluid) between the gun and the casing to form holes of controlled size and depth into the casing, cement, and/or nearby reservoir material. During and/or following perforation, the perforating fluid generally flows into the areas formed by the perforating gun.

In some embodiments, the perforating fluid comprises an emulsion or microemulsion. Emulsions and microemulsions are described in more detail herein. The addition of an emulsion or microemulsion in the perforating fluid may have many advantages as compared to the use of a perforating fluid alone, including, for example, preventing or minimizing damage from imbibition, preventing the formation of new filter cakes (e.g., that may reduce hydrocarbons in the reservoir material from entering the casing), and/or increasing the pressure differential between the wellbore and the surrounding reservoir material.

In some embodiments, the perforating fluid comprises an emulsion or microemulsion as described herein wherein the emulsion or microemulsion is present in an amount between about 0.5 and about 200 gpt of perforating fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10 gpt. In some embodiments, the emulsion or microemulsion is present in an amount between about 1 and about 10 gpt. In some embodiments, the perforating fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt of an emulsion or a microemulsion. In some embodiments, the perforating fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

II-E. Stimulation

As will be known to those skilled in the art, generally the completion of the formation of wellbore includes stimulation and/or re-fracturing processes. The term stimulation generally refers to the treatment of geological formations to improve the recovery of liquid hydrocarbons (e.g., formation crude oil and/or formation gas). The porosity and permeability of the formation determine its ability to store hydrocarbons, and the facility with which the hydrocarbons can be extracted from the formation. Common stimulation techniques include well fracturing (e.g., fracturing, hydraulic fracturing) and acidizing (e.g., fracture acidizing, matrix acidizing) operations.

Non-limiting examples of fracturing operations include hydraulic fracturing, which is commonly used to stimulate low permeability geological formations to improve the recovery of hydrocarbons. The process can involve suspending chemical agents in a stimulation fluid (e.g., fracturing fluid) and injecting the fluid down a wellbore. The fracturing fluid may be injected at high pressures and/or at high rates into a wellbore. However, the assortment of chemicals pumped down the well can cause damage to the surrounding formation by entering the reservoir material and blocking pores. For example, one or more of the following may occur: wettability reversal, emulsion blockage, aqueous-filtrate blockage, mutual precipitation of soluble salts in wellbore-fluid filtrate and formation water, deposition of paraffins or asphaltenes, condensate banking, bacterial plugging, and/or gas breakout. In addition, fluids may become trapped in the formation due to capillary end effects in and around the vicinity of the formation fractures. The addition of an emulsion or microemulsion in the fracturing fluid may have many advantages as compared to the use of a fracturing fluid alone, including, for example, maximizing the transfer and/or recovery of injected fluids, increasing oil and/or gas recovery, and/or other benefits described herein.

Non-limiting examples of acidizing operations include the use of water-based fluids to remove drilling fluids and particles remaining in the wellbore to permit optimal flow feeding into the wellbore (e.g., matrix acidizing). Matrix acidizing generally refers to the formation of wormholes (e.g., pores or channels through which oil, gas, and/or other fluids can flow) through the use of a fluid (e.g., acidic stimulation fluid) comprising, for example, an acid, wherein the wormholes are continuous channels and holes formed in the reservoir of a controlled size and depth. The addition of an emulsion or microemulsion to the stimulation fluid may have many advantages as compared to the use of a stimulation fluid alone, including, for example, the formation of an acidic gel (e.g., which creates a more uniform distribution of acid across the reservoir materials as it travels along the surface), increasing oil and/or gas recovery, and/or other benefits described herein.

Fracture acidizing generally refers to the use of an acid to extend fractures formed by the injection of treatment fluid at high-pressure (e.g., fracturing). The addition of an emulsion or microemulsion to the stimulation fluid may have advantages as compared to the use of a stimulation fluid alone, including, for example, increasing the removal of fracturing fluid skin (e.g., fluid and solids from the reservoir which may block optimal flow of the wellbore) from the fractures allowing for more effective acid treatment.

As will be known to those skilled in the art, stimulation fluids (e.g., acidizing fluids, fracturing fluids, etc.) may be injected into the wellbore to assist in the removal of leftover drilling fluids or reservoir materials. Non-limiting examples of stimulation fluids (e.g., as an acidizing fluid) include water and hydrochloric acid (e.g., 15% HCl in water). In some embodiments, the acid is partially or completely consumed after reacting with carbonates in the reservoir. Further non-limiting examples of stimulation fluids include conventional fluids (e.g., gelling agents comprising cross-linking agents such as borate, zirconate, and/or titanate), water fracture fluids (e.g., friction reducers, gelling agents, viscoelastic surfactants), hybrid fluids (e.g., friction reducers, gelling agents, viscoelastic surfactants, and combinations thereof), energized fluids (e.g., foam generating energizers comprising nitrogen or carbon dioxide), acid fracture fluids (e.g., gelled acid base fluids), gas fracture fluids (e.g., propane), and matrix acidizing fluids (e.g., an acid).

In some embodiments, the stimulation fluid comprises a viscosifier (e.g., guar gum) and/or a bridging agent (e.g., calcium carbonate, size salt, oil-soluble resins, mica, ground cellulose, nutshells, and other fibers). In some embodiments, removal of leftover drilling fluids or reservoir fluids refers to the breakdown and removal of a near-wellbore skin (e.g., fluid and solids from the reservoir which may block optimal flow into the wellbore). Non-limiting examples of skin materials include paraffin, asphaltene, drilling mud components (e.g., barite, clays), non-mobile oil in place, and fines (e.g., which may block pores in the reservoir material). The addition of an emulsion or microemulsion to the acidizing fluid may have many advantages as compared to the use of a acidizing fluid alone, including, for example, increasing the breakdown of the skin into smaller components to be more easily removed by flow from the wellbore, increasing oil and/or gas recovery, and/or other benefits described herein.

In addition to some of the benefits described above, in some embodiments, incorporation of an emulsion or a microemulsion into a stimulation fluid can aid in reducing fluid trapping, for example, by reducing capillary pressure and/or minimizing capillary end effects, as compared to the use of a stimulation fluid alone. In addition, incorporation of an emulsion or microemulsion into stimulation fluids can promote increased flow back of aqueous phases following well treatment, increasing production of liquid and/or gaseous hydrocarbons, and/or increasing the displacement of residual fluids (e.g., drilling fluids, etc.) by formation crude oil and/or formation gas. Other non-limiting advantages as compared to the use of a stimulation fluid alone, include increasing the amount of water extracted from the reservoir, increasing the amount or oil and/or gas extracted from the reservoir, more uniformly distributing the acid along the surface of the wellbore and/or reservoir, improving the formation of wormholes (e.g., by slowing down the reaction rate to create deeper and more extensive wormholes during fracture acidizing). In certain embodiments, the addition of an emulsion or microemulsion increases the amount of hydrocarbons transferred from the reservoir to fluids injected into the reservoir during hydraulic fracturing.

In some embodiments, the stimulation fluid comprises an emulsion or microemulsion as described herein wherein the emulsion or microemulsion is present in an amount between about 0.5 and about 200 gpt of stimulation fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10 gpt. In some embodiments, the emulsion or microemulsion is present in an amount between about 2 and about 5 gpt. In some embodiments, the stimulation fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt, of an emulsion or a microemulsion. In some embodiments, the stimulation fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

In some embodiments, refracturing, or the process of repeating the above stimulation processes, is further improved by the addition of an emulsion or microemulsion to the stimulation fluid.

In some embodiments, the emulsion or microemulsion for use with a stimulation fluid (e.g., a fracturing fluid) comprising a surfactant as in Formula I:

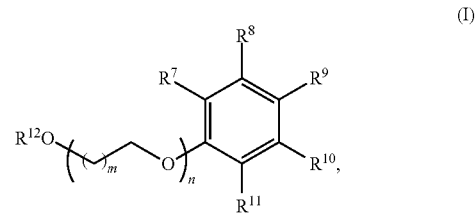

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $R^{12}$ is hydrogen or alkyl, n is 1-100, and each m is independently 1 or 2. In some embodiments, for a compound of Formula (I), $R^{12}$ is hydrogen or $C_{1-6}$ alkyl. In some embodiments, for a compound of Formula (I), $R^{12}$ is H, methyl, or ethyl. In some embodiments, for a compound of Formula (I), $R^{12}$ is H.

In some embodiments, the emulsion or microemulsion for use with a stimulation fluid (e.g., a fracturing fluid) comprising a surfactant as in Formula II:

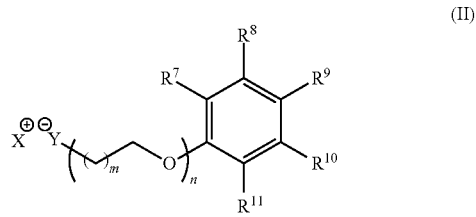

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $Y^-$ is an anionic group, $X^+$ is a cationic group, n is 1-100, and each m is independently 1 or 2. In some embodiments, for a compound of Formula (II), $X^+$ is a metal cation or $N(R^{13})_4$, wherein each $R^{13}$ is independently selected from the group consisting of hydrogen, optionally substituted alkyl, or optionally substituted aryl. In some embodiments, $X^+$ is $NH_4$. Non-limiting examples of metal cations are $Na^+$, $K^+$, $Mg^{+2}$, and $Ca^{+2}$. In some embodiments, for a compound of Formula (II), $Y^-$ is —O⁻, —SO₂O⁻, or —OSO₂O⁻.

In some embodiments, the emulsion or microemulsion for use with a stimulation fluid (e.g., a fracturing fluid) comprising a surfactant as in Formula III:

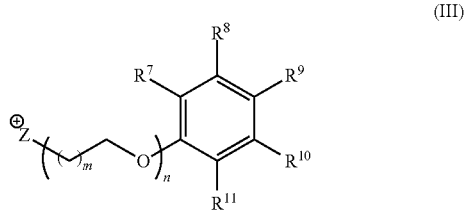

wherein each of $R^7$, $R^8$, $R^9$, $R^{10}$ and $R^{11}$ are the same or different and are selected from the group consisting of hydrogen, optionally substituted alkyl, and —CH═CHAr, wherein Ar is an aryl group, provided at least one of $R^7$, $R^8$, $R^9$, $R^{10}$, and $R^{11}$ is —CH═CHAr, $Z^+$ is a cationic group, n is 1-100, and each m is independently 1 or 2. In some embodiments, for a compound of Formula (III), $Z^+$ is $N(R^{13})_3$, wherein each $R^{13}$ is independent selected from the group consisting of hydrogen, optionally substituted alkyl, or optionally substituted aryl.

In some embodiments, for a compound of Formula (I), (II), or (III), two of $R^7$, $R^8$, $R^9$, $R^{10}$, and $R^{11}$ are —CH═CHAr. In some embodiments, for a compound of Formula (I), (II), or (III), one of $R^7$, $R^8$, $R^9$, $R^{10}$ and $R^{11}$ is —CH═CHAr and each of the other groups is hydrogen. In some embodiments, for a compound of Formula (I), (II), or (III), two of $R^7$, $R^8$, $R^9$, $R^{10}$, and $R^{11}$ are —CH═CHAr and each of the other groups is hydrogen. In some embodiments, for a compound of Formula (I), (II), or (III), $R^7$ and $R^8$ are —CH═CHAr and $R^9$, $R^{10}$, and $R^{11}$ are each hydrogen. In some embodiments, for a compound of Formula (I), (II), or (III), three of $R^7$, $R^8$, $R^9$, $R^{10}$, and $R^{11}$ are —CH═CHAr and each of the other groups is hydrogen. In some embodiments, for a compound of Formula (I), (II), or (III), $R^7$, $R^8$, and $R^9$ are —CH═CHAr and $R^{19}$ and $R^{11}$ are each hydrogen. In embodiments, for a compound of Formula (I), (II), or (III), Ar is phenyl. In some embodiments, for a compound of Formula (I), (II), or (III), each m is 1. In some embodiments, for a compound of Formula (I), (II), or (III), each m is 2. In some embodiments, for a compound of Formula (I), (II), or (III), n is 6-100, or 1-50, or 6-50, or 6-25, or 1-25, or 5-50, or 5-25, or 5-20.

In some embodiments, an emulsion or microemulsion comprises a surfactant of Formula (I), (II), or (III) in an amount between about 1 wt % and about 20 wt %, or between about 3 wt % and about 15 wt %, or between about 5 wt % and about 13 wt %, or between about 5 wt % and about 11 wt %, or between about 7 wt % and about 11 wt %, or between about 10 wt % and about 12 wt %, or between about 8 wt % and about 12 wt %, or between about 8 wt % and about 10 wt %, or about 9 wt %. In some embodiments, the emulsion or microemulsion comprises, in addition to the surfactant of Formula (I), (II), or (III), water and a non-aqueous phase (e.g., a terpene), and optionally other additives (e.g., one or more additional surfactants, an alcohol, a freezing point depression agent, etc.). In some embodiments, the emulsion or microemulsion comprises, in addition to the surfactant of Formula (I), (II), or (III), water, a terpene, an alcohol, one or more additional surfactants, and optionally other additives (e.g., a freezing point depression agent). In some embodiments, the emulsion or microemulsion comprises, in addition to the surfactant of Formula (I), (II), or (III), between about 20 wt % and about 90 wt % water, between about 2 wt % and about 70 wt % of one or more additional surfactants, between about 1 wt % and about 80 wt % of a solvent (e.g., terpene), and between about 10 wt % and about 40 wt % of a mutual solvent (e.g., alcohol). In some embodiments, the emulsion or microemulsion comprises, in addition to the surfactant of Formula (I), (II), or (III), between about 10 wt % and 80 wt % water, between about 2 wt % and about 80 wt % of one or more additional surfactants, between about 1 wt % and about 70 wt % of a solvent (e.g., terpene), and between about 5 wt % and about 40 wt % of a mutual solvent (e.g., alcohol). In some embodiments, the emulsion or microemulsion comprises, in addition to the surfactant of Formula (I), (II), or (III), between about 20 wt % and 90 wt % water, between about 2 wt % and about 70 wt % of one or more additional surfactants, between about 1 wt % and about 78 wt % of a solvent (e.g., terpene), and between about 22 wt % and about 40 wt % of a mutual solvent (e.g., alcohol). Non-limiting examples of surfactants of Formula (I), (II), or (III) include styrylphenol ethoxylate, a tristyrylphenol ethoxylate, a styrylphenol propoxylate, a tristyrylphenol propoxylate, a styrylphenol ethoxylate propoxylate, or a tristyrylphenol ethoxylate propoxylate.

II-F. Kill Fluids

As will be known to those skilled in the art, generally during the lifecycle of the well, it may be necessary to temporarily halt the recovery of gas and/or oil (e.g., to repair equipment). Generally, this is accomplished by injecting a fluid, herein referred to as a kill fluid, into the wellbore.

In some embodiments, a kill fluid comprises an emulsion or microemulsion. Emulsions and microemulsions are described in more detail herein. The addition of an emulsion or microemulsion in the kill fluid may have many advantages as compared to the use of a kill fluid alone including, for example, increasing the amount of kill fluid recovered and/or improving the ability for the well to return to the rate of production it exhibited prior to injection of the kill fluid.

In some embodiments, the kill fluid comprises an emulsion or microemulsion as described herein wherein the emulsion or microemulsion is present in an amount between about 0.5 and about 200 gpt of kill fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10 gpt. In some embodiments, the emulsion or microemulsion is present in an amount between about 1 and about 10 gpt. In some embodiments, the kill fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt, of an emulsion or a microemulsion. In some embodiments, the kill fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

II-G. Enhanced Oil Recovery and/or Improved Oil Recovery

As will be known to those skilled in the art, generally during the life cycle of the well, procedures may be performed to increase the amount of oil and/or gas recovered from the wellbore. Such procedures are generally referred to as enhanced oil recovery (EOR) and/or improved oil recovery (IOR). EOR/IOR typically uses a secondary or a tertiary system (e.g., comprising one or more of water, polymers, surfactants, etc.) to create a new mechanism which increases the displacement of oil and/or gas from the reservoir for recovery. Generally, EOR/IOR uses an existing wellbore which has been converted into a recovering well (e.g., an injecting well). In some embodiments, the recovering well is used to inject the secondary or tertiary system into the reservoir at a continuous or noncontinuous rate and/or pressure to increase the amount of hydrocarbons extracted from the reservoir. Non-limiting examples of EOR/IOR procedures include water flooding, gas flooding, polymer flooding, and/or the use of surfactant polymers. For example, the EOR/IOR procedure may comprise an EOR/IOR fluid (e.g., a water flooding fluid, a polymer flooding fluid, a surfactant flooding fluid, a gas flooding fluid, a surfactant, or combinations thereof).

Generally, water flooding (e.g., secondary recovery) refers to the injection of a water flooding fluid into a reservoir to increase the amount of oil and/or gas recovered from the wellbore. In some embodiments, the water flooding fluid comprises one or more of water (e.g., water, makeup water, etc.), acidizing fluids (e.g., matrix acidizing fluids), surfactants, polymers, and foam. In certain embodiments, the water flooding fluid comprises a polymer (e.g., a polymer flooding fluid), and/or a surfactant (i.e. during a surfactant flood), and/or a surfactant polymer flood (i.e. during a SP-flood), and/or an alkaline surfactant polymer (i.e. during an ASP-flood). In some embodiments, the water flooding fluid comprises an emulsion or microemulsion. Emulsions and microemulsions are described in more detail herein. The addition of an emulsion or microemulsion to the water flooding fluid may have many advantages as compared to a water flooding fluid alone including increasing the adhesion of the polymer to oil, increasing interfacial efficiency of the polymer, increasing the amount of oil and/or gas extracted from the reservoir, decreasing the volume of water needed to extract the same amount of oil, and/or lowering the pressure necessary to extract hydrocarbons from the reservoir. In some embodiments, the addition of an emulsion or microemulsion to the water flooding fluid increases the recovery of fracturing fluids (e.g., fracturing fluids not previously removed).

Generally, polymer gels are injected into the formation during secondary and tertiary recovery to block water and gas (carbon dioxide and nitrogen) flow from previously swept zones and large fractures (e.g., thief zones) or to prevent imbibition of water from a part of the formation that abuts the oil containing zone. Use of polymers in these cases is commonly referred to as conformance control or water shut-off. In some embodiments, emulsions and microemulsions are injected into the formation as a preflush to prepare the formation for the polymer gel injection. The addition of an emulsion or microemulsion prior to the injection of a polymer gel may have many advantages as compared the injection of a polymer gel alone including enhancing the adhesion of the polymer to the formation (e.g., by removing surface contamination and residual oil).

Generally, gas flooding refers to the injection of a gas (e.g., carbon dioxide, nitrogen) into a reservoir to increase the amount of oil and/or gas recovered from the wellbore. In some embodiments, gas flooding comprises a gas flooding fluid (e.g., liquid carbon dioxide and/or liquid nitrogen). In some embodiments, the gas flooding fluid comprises an emulsion or microemulsion. The addition of an emulsion or a microemulsion in the gas flooding fluid may have many advantages as compared to the use of a gas flooding fluid alone, including reducing the miscibility pressure as compared to gas flooding alone, and/or reducing the volume of liquid carbon dioxide or liquid nitrogen that expands into a gas during the gas flooding process.

Generally, a formulation (e.g., a foam diverter, emulsion diverter, or matrix diverter) that forms a foam upon contact with gas (e.g., carbon dioxide, flu gas, methane, natural gas, or nitrogen) is injected into the formation (e.g., in an aqueous treatment fluid or injected into the gas stream) that forms a foam upon contact with gas (e.g., carbon dioxide or nitrogen) is injected into the formation to divert gas flow from high permeability zones to low permeability zones during a gas flood EOR/IOR treatment. These matrix diversion activities are commonly employed in situations where gas (e.g. carbon dioxide, flu gas, methane, natural gas, or nitrogen) rapidly penetrates the formation after a water flooding step without producing additional hydrocarbons. In these cases the rapid penetration of gas through the reservoir is due to gas gravity override or due to exhaustion of hydrocarbon reserves in high-permeability zones. In some embodiments, an emulsion and/or microemulsion is injected into the formation as a preflush to prepare the formation for the foam diverter injection. The addition of an emulsion or microemulsion prior to the injection of the foam may have many advantages as compared the injection of the foam alone including enhancing the stability of the foam (e.g., by removing surface contamination and residual oil), or increasing the penetration of the foam into the formation (e.g., by controlling the adsorption of the diverter onto the rock surface).

In some embodiments, the EOR/IOR fluid comprises an emulsion or microemulsion as described herein wherein the emulsion or microemulsion is present in an amount between about 0.5 and about 200 gpt of EOR/IOR fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10 gpt. In some embodiments, the emulsion or microemulsion is present in an amount between about 1 and about 10 gpt. In some embodiments, the EOR/IOR fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt of an emulsion or a microemulsion. In some embodiments, the EOR/IOR fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

II-H. Stored Fluid

As will be known to those skilled in the art, wellbores and/or reservoirs which are no longer used for oil and/or gas recovery may generally be used to store excess fluid (e.g., water, makeup water, salt water, brine, etc.) recovered from the reservoir. In some embodiments, an emulsion or microemulsion is added to the stored fluid. The addition of an emulsion or microemulsion to the stored fluid may reduce corrosion of the wellbore.

In some embodiments, the stored fluid comprises an emulsion or microemulsion as described herein wherein the emulsion or microemulsion is present in an amount between about 0.5 and about 200 gpt of stored fluid, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 2 and about 5 gpt, or between about 5 and about 10 gpt. In some embodiments, the emulsion or microemulsion is present in an amount between about 1 and about 10 gpt. In some embodiments, the stored fluid contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt of an emulsion or a microemulsion. In some embodiments, the stored fluid contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

II-I. Offshore Applications

It should be understood, that for each step of the life cycle of the well described herein, the description may apply to onshore or offshore wells. In some embodiments, stimulation fluids are used in onshore wells. In some embodiments, stimulation fluids are used in offshore wells and/or during fracture packing (e.g., gravel packing). As will be known by those skilled in the art, stimulation fluids for use in offshore wells may comprise stable media (e.g., gravel) that may be injected into a wellbore to protect the integrity of the wellbore itself. In some embodiments, stimulation fluids for use in offshore wells are used in high rate water packing wherein stimulation fluids may be injected at higher rates (e.g., 400 barrels/min), at higher pressures, and/or at higher volumes as compared to an onshore well. The addition of an emulsion or microemulsion in the stimulation fluid for use in offshore wells may have many advantages as compared to the use of a stimulation fluid alone, including, for example, minimizing the damaging effects of stimulation fluids that come in contact with the reservoir, and/or increasing the amount of hydrocarbons extracted from the reservoir.

In some embodiments, the stimulation fluid utilized in offshore wells or during fracture packing comprises an emulsion or microemulsion as described herein wherein the emulsion or microemulsion is present in an amount between about 0.5 and about 200 gpt of stimulation fluid for use in offshore wells or during fracture packing, or between about 0.5 and about 100 gpt, or between about 0.5 and about 50 gpt, or between about 1 and about 50 gpt, or between about 1 and about 20 gpt, or between about 2 and about 20 gpt, or between about 2 and about 10 gpt, or between about 5 and about 10 gpt. In some embodiments, the emulsion or microemulsion is present in an amount between about 2 and about 5 gpt. In some embodiments, the stimulation fluid for use in offshore wells or during fracture packing contains at least about 0.5 gpt, or at least about 1 gpt, or at least about 2 gpt, or at least about 4 gpt, or at least about 10 gpt, or at least about 20 gpt, or at least about 50 gpt, or at least about 100 gpt, or at least about 200 gpt of an emulsion or a microemulsion. In some embodiments, the stimulation fluid for use in offshore wells or during fracture packing contains less than or equal to about 200 gpt, or less than or equal to about 100 gpt, or less than or equal to about 50 gpt, or less than or equal to about 20 gpt, or less than or equal to about 10 gpt, or less than or equal to about 4 gpt, or less than or equal to about 2 gpt, or less than or equal to about 1 gpt, or less than or equal to about 0.5 gpt of an emulsion or microemulsion.

III. Definitions

For convenience, certain terms employed in the specification, examples, and appended claims are listed here.

Definitions of specific functional groups and chemical terms are described in more detail below. For purposes of this invention, the chemical elements are identified in accordance with the Periodic Table of the Elements, CAS version, *Handbook of Chemistry and Physics*, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

The term "aliphatic," as used herein, includes both saturated and unsaturated, nonaromatic, straight chain (i.e. unbranched), branched, acyclic, and cyclic (i.e. carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkane" is given its ordinary meaning in the art and refers to a saturated hydrocarbon molecule. The term "branched alkane" refers to an alkane that includes one or more branches, while the term "unbranched alkane" refers to an alkane that is straight-chained. The term "cyclic alkane" refers to an alkane that includes one or more ring structures, and may be optionally branched. The term "acyclic alkane" refers to an alkane that does not include any ring structures, and may be optionally branched.

The term "alkene" is given its ordinary meaning in the art and refers to an unsaturated hydrocarbon molecule that includes one or more carbon-carbon double bonds. The term "branched alkene" refers to an alkene that includes one or more branches, while the term "unbranched alkene" refers to an alkene that is straight-chained. The term "cyclic alkene" refers to an alkene that includes one or more ring structures, and may be optionally branched. The term "acyclic alkene" refers to an alkene that does not include any ring structures, and may be optionally branched.

The term "aromatic" is given its ordinary meaning in the art and refers to aromatic carbocyclic groups, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substitutents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted.

The term "amine" is given its ordinary meaning in the art and refers to a primary ($—NH_2$), secondary ($—NHR_x$), tertiary ($—NR_xR_y$), or quaternary ($—N+R_xR_yR_z$) amine (e.g., where $R_x$, $R_y$, and $R_z$ are independently an aliphatic, alicyclic, alkyl, aryl, or other moieties, as defined herein).

The term "amide" is given its ordinary meaning in the art and refers to a compound containing a nitrogen atom and a carbonyl group of the structure $R_xCONR_yR_z$ (e.g., where $R_x$, $R_y$, and $R_z$ are independently an aliphatic, alicyclic, alkyl, aryl, or other moieties, as defined herein).

These and other aspects of the present invention will be further appreciated upon consideration of the following Examples, which are intended to illustrate certain particular embodiments of the invention but are not intended to limit its scope, as defined by the claims.

EXAMPLES

Example 1

This example describes a non-limiting experiment for determining displacement of residual aqueous treatment fluid by formation crude oil. A 25 cm long, 2.5 cm diameter capped glass chromatography column was packed with 77 grams of 100 mesh sand or a mixture of 70/140 mesh shale and 100 mesh sand or a mixture of 70/140 mesh shale and 100 mesh sand. The column was left open on one end and a PTFE insert containing a recessed bottom, 3.2 mm diameter outlet, and nipple was placed into the other end. Prior to placing the insert into the column, a 3 cm diameter filter paper disc (Whatman, #40) was pressed firmly into the recessed bottom of the insert to prevent leakage of 100 mesh sand. A 2 inch piece of vinyl tubing was placed onto the nipple of the insert and a clamp was fixed in place on the tubing prior to packing. The columns were gravity-packed by pouring approximately 25 grams of the diluted microemulsions (e.g., the microemulsions described in Examples 1 or 2, and diluted with 2% KCl, e.g., to about 2 gpt, or about 1 gpt) into the column followed by a slow, continuous addition of sand. After the last portion of sand had been added and was allowed to settle, the excess of brine was removed from the column so that the level of liquid exactly matched the level of sand. Pore volume in the packed column was calculated as the difference in mass of fluid prior to column packing and after the column had been packed. Three additional pore volumes of brine were passed through the column. After the last pore volume was passed, the level of brine was adjusted exactly to the level of sand bed. Light condensate oil was then added on the top of sand bed to form the 5 cm oil column above the bed. Additional oil was placed into a separatory funnel with a side arm open to an atmosphere. Once the setup was assembled, the clamp was released from the tubing, and timer was started. Throughout the experiment the level of oil was monitored and kept constant at a 5 cm mark above the bed. Oil was added from the separatory funnel as necessary, to ensure this constant level of head in the column. Portions of effluent coming from the column were collected into plastic beakers over a measured time intervals. The amount of fluid was monitored. When both brine and oil were produced from the column, they were separated with a syringe and weighed separately. The experiment was conducted for 3 hours at which the steady-state conditions were typically reached. The cumulative % or aqueous fluid displaced from the column over 120 minute time period, and the steady-state mass flow rate of oil at t=120 min through the column were determined.

Example 2

This example describes a non-limiting experiment for determining displacement of residual aqueous treatment fluid by formation gas. A 51 cm long, 2.5 cm inner diameter capped glass chromatography column was filled with approximately 410±20 g of 20/40 mesh Ottawa sand and the diluted microemulsions. To ensure uniform packing, small amounts of proppant were interchanged with small volumes of liquid. Periodically the mixture in the column was homogenized with the help of an electrical hand massager, in order to remove possible air pockets. Sand and brine were added to completely fill the column to the level of the upper cap. The exact amounts of fluid and sand placed in the column were determined in each experiment. The column was oriented vertically and was connected at the bottom to a nitrogen cylinder via a gas flow controller pre-set at a flow rate of 60 cm3/min. The valve at the bottom was slowly opened and liquid exiting the column at the top was collected into a tarred jar placed on a balance. Mass of collected fluid was recorded as a function of time by a computer running a data logging software. The experiments were conducted until no more brine could be displaced from the column. The total % of fluid recovered was then calculated.

Example 3

This example describes a general preparation method for the production of diluted microemulsion. The microemulsions were prepared in the laboratory by mixing the ingredients listed in specific examples. All ingredients are commercially available materials. In some embodiments, the components were mixed together in the order water-alcohol-surfactant- citrus terpene solvent, but other order of addition may also be employed. The mixtures were then agitated on a magnetic stirrer for 5 10 minutes. The microemulsions were then diluted to concentrations of 1 or 2 gallons per 1000 gallons with 2% KCl brine and these diluted fluids were used in displacement experiments (e.g., as described in Examples 1 and 2).

Example 4

A number of microemulsions were prepared according to the method described in Example 3 and comprising the components described in Table 2. The microemulsions comprises a styrylphenol ethoxylate surfactant, water, other surfactants, co-solvents, and a solvent (e.g., hydrocarbon). The percent displacement of brine by crude oil was determined using the method described in Example 1. The results are provided in Table 2.

TABLE 2

| Exp't No. | Amount of styrylphenol ethoxylate used in the formulation (wt %) | Formulation Composition (wt % range) | % displacement of brine by crude oil |
| --- | --- | --- | --- |
| 1 | 11 ± 1 | Water 20-90% Other surfactants 2-70% Cosolvents 10-40% Hydrocarbon 1-80% | 69% |
| 2 | 8 ± 3 | Water 10-80% Other surfactants 2-80% Cosolvents 5-40% Hydrocarbon 1-70% | 77% |
| 3 | 10 ± 2 | Water 20-90% Other surfactants 2-70% Cosolvents 22-40% Hydrocarbon 1-78% | 83% |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e. elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e. the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition for use in an oil and/or gas well having a wellbore, comprising a fluid and an emulsion or a microemulsion, wherein the emulsion or the microemulsion comprises:
water;
an alcohol;
a solvent comprising a terpene; and
a surfactant having a structure as in Formula II:

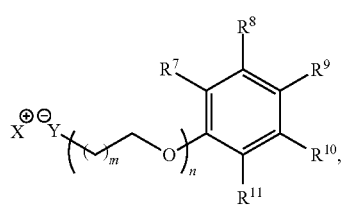

(II)

wherein each of $R^7$, $R^8$, $R^9$, $R^{10}$, and $R^{11}$ are the same or different and are selected from the group consisting of hydrogen, optionally substituted alkyl, and —CH=CHAr, provided at least one of $R^7$, $R^8$, $R^9$, $R^{10}$, and $R^{11}$ is —CH=CHAr;
Ar is an aryl group;
$Y^-$ is an anionic group;
$X^+$ is a cationic group;
n is 1-100; and
m is 1.

2. The composition as in claim 1, wherein X+ is a metal cation or N(R13)4+, wherein each R13 is independently selected from the group consisting of hydrogen, optionally substituted alkyl, or optionally substituted aryl.

3. The composition as in claim 1, wherein X+ is NH4+.

4. The composition as in claim 1, wherein X+ is Na+, K+, Mg+2, or Ca+2.

5. The composition as in claim 1, wherein Y— is —O—, —SO2O—, or —OSO2O—.

6. The composition as in claim 1, wherein at least two of R7, R8, R9, R10, and R11 are —CH=CHAr.

7. The composition as in claim 1, wherein R7 and R8 are —CH=CHAr and R9, R10, and R11 are each hydrogen.

8. The composition as in claim 1, wherein R7, R8, and R9 are —CH=CHAr and R10 and R11 are each hydrogen.

9. The composition as in claim 1, wherein Ar is phenyl.

10. The composition as in claim 1, wherein n is 1-50.

11. The composition as in claim 1, wherein the fluid is a fracturing fluid.

12. The composition as in claim 1, wherein the surfactant is selected from the group consisting of styrylphenol ethoxylate or a tristyrylphenol ethoxylate.

13. The composition as in claim 1, wherein the emulsion or the microemulsion comprises between about 1 wt % and 60 wt % water versus the total emulsion or microemulsion composition.

14. The composition as in claim 1, wherein the emulsion or the microemulsion comprises between about 1 wt % and 30 wt % solvent versus the total emulsion or microemulsion composition.

15. The composition as in claim 1, wherein the emulsion or the microemulsion comprises between about 5 wt % and 65 wt % surfactant versus the total emulsion or microemulsion composition.

16. The composition as in claim 1, wherein the emulsion or the microemulsion comprises a first type of surfactant and a second type of surfactant.

17. The composition as in claim 1, wherein the emulsion or the microemulsion comprises between about 1 wt % and about 50 wt % alcohol versus the total emulsion or microemulsion composition.

18. The composition as in claim 1, wherein the alcohol comprises isopropanol.

19. The composition as in claim 1, wherein the emulsion or the microemulsion comprises a freezing point depression agent.

20. The composition as in claim 19, wherein the emulsion or the microemulsion comprises a first type of freezing point depression agent and a second type of freezing point depression agent.

21. The composition as in claim 19, wherein the emulsion or the microemulsion comprises between about 0 wt % and about 25 wt % freezing point depression agent versus the total emulsion or microemulsion composition.

22. The composition as in claim 19, wherein the freezing point depression agent comprises an alkylene glycol, an alcohol, and/or a salt.

23. The composition as in claim 1, wherein the emulsion or the microemulsion further comprises at least one other additive.

24. The composition as in claim 23, wherein the at least one other additive is selected from the group consisting salts and acids.

25. The composition as in claim 23, wherein the at least one other additive is present in an amount between about 1 wt % and about 30 wt % versus the total emulsion or microemulsion composition.

26. The composition as in claim 1, wherein the emulsion or the microemulsion is present in an amount between about 0.5 gallons per thousand and about 100 gallons per thousand of the fluid.

27. The composition as in claim 1, wherein the fluid is selected from the group consisting of drilling fluids, mud displacement fluids, cementing fluids, perforating fluids, stimulation fluids, kill fluids, EOR/IOR fluids, and stored fluids.

* * * * *

UNITED STATES PATENT AND TRADEMARK OFFICE
CERTIFICATE OF CORRECTION

| | | |
|---|---|---|
| PATENT NO. | : 9,850,418 B2 | Page 1 of 1 |
| APPLICATION NO. | : 15/288066 | |
| DATED | : December 26, 2017 | |
| INVENTOR(S) | : Lakia M. Champagne et al. | |

It is certified that error appears in the above-identified patent and that said Letters Patent is hereby corrected as shown below:

In the Specification

Column 18, Line 46, "C1-16" should be "$C_{1-16}$"

Column 24, Line 47, "$N(R^{13})_4$," should be "$N(R^{13})_4^+$,"

Column 24, Line 50, "$NH_4$." should be "$NH_4^+$."

Column 25, Line 8, "$N(R^{13})_3$," should be "$N(R^{13})_3^+$,"

Column 36, Line 63, "$N(R^{13})_4$," should be "$N(R^{13})_4^+$,"

Column 36, Line 66, "$NH_4$." should be "$NH_4^+$."

Column 37, Line 25, "$N(R^{13})_3$," should be "$N(R^{13})_3^+$,"

Column 43, Line 42, "$(-N+R_xR_yR_z)$" should be "$(-N^+R_xR_yR_z)$"

In the Claims

Column 47, Claim 2, Line 34, "X+" should be "$X^+$"

Column 47, Claim 2, Line 35, "N(R13)4+," should be "$N(R^{13})_4^+$,"

Column 47, Claim 2, Line 35, "each R13" should be "each $R^{13}$"

Column 47, Claim 3, Line 38, "X+ is NH4+" should be "$X^+$ is $NH_4^+$"

Signed and Sealed this
Third Day of April, 2018

Andrei Iancu
*Director of the United States Patent and Trademark Office*